United States Patent
Jones et al.

(10) Patent No.: US 7,742,386 B2
(45) Date of Patent: Jun. 22, 2010

(54) MULTIPLE CHANNEL INTERFERENCE CANCELLATION

(75) Inventors: William W. Jones, Aliso Viejo, CA (US); George A. Zimmerman, Rolling Hills Estates, CA (US)

(73) Assignee: Solarflare Communications, Inc., Irvine, CA (US)

( * ) Notice: Subject to any disclaimer, the term of this patent is extended or adjusted under 35 U.S.C. 154(b) by 708 days.

(21) Appl. No.: 11/250,827

(22) Filed: Oct. 13, 2005

(65) Prior Publication Data

US 2006/0034162 A1 Feb. 16, 2006

Related U.S. Application Data

(63) Continuation of application No. 10/424,421, filed on Apr. 28, 2003, now Pat. No. 7,002,897.

(51) Int. Cl.
*H04J 1/12* (2006.01)
*H04J 3/10* (2006.01)
*H04B 3/20* (2006.01)
*H04M 9/08* (2006.01)

(52) U.S. Cl. .............. 370/201; 370/210; 370/290; 370/292; 379/406.08; 379/406.11

(58) Field of Classification Search .............. None
See application file for complete search history.

(56) References Cited

U.S. PATENT DOCUMENTS

| | | |
|---|---|---|
| 4,359,778 A | 11/1982 | Lee |
| 4,583,235 A | 4/1986 | Dörner et al. |
| 4,956,838 A | 9/1990 | Gilloire et al. |
| 5,222,084 A | 6/1993 | Takahashi |
| 5,305,307 A | 4/1994 | Chu |

(Continued)

FOREIGN PATENT DOCUMENTS

EP 0250048 12/1987

(Continued)

OTHER PUBLICATIONS

Oscar Agazzi, et al., "10Gb/s PMD Using PAM-5 Trellis Coded Modulation", Broadcom, *IEEE* 802.3, Albuquerque, New Mexico, Mar. 6-10, 2000, 38 pages.

(Continued)

*Primary Examiner*—Gregory B Sefcheck
(74) *Attorney, Agent, or Firm*—Weide & Miller, Ltd.

(57) ABSTRACT

A method and apparatus for reducing crosstalk in a multi-channel communication system is disclosed. In one embodiment, outgoing signals in a multi-channel environment are manipulated into a transform domain, such as the frequency domain. Thereafter, the signals may be combined and modified based on a weighting variable to create a cancellation signal. Combined processing greatly reduces system complexity and increases processing speed. After processing in the transform domain, the cancellation signal undergoes further processing to return the cancellation signal into the time domain. The cancellation signal may then be combined with received signals to cancel crosstalk or echo. A method and apparatus for crosstalk cancellation in the analog domain and digital domain is also disclosed. Cancellation at least partially in the analog domain reduces the dynamic range requirements for digital to analog converters within the front-end processing system of a receiver and thereby reducing clipping and increasing operating speed.

31 Claims, 18 Drawing Sheets

U.S. PATENT DOCUMENTS

| | | | |
|---|---|---|---|
| 5,633,863 | A | 5/1997 | Gysel et al. |
| 5,646,958 | A | 7/1997 | Tsujimoto |
| 5,856,970 | A | 1/1999 | Gee et al. |
| 5,896,452 | A | 4/1999 | Yip et al. |
| 6,088,827 | A | 7/2000 | Rao |
| 6,147,979 | A | 11/2000 | Michel et al. |
| 6,160,790 | A | 12/2000 | Bremer |
| 6,167,082 | A | 12/2000 | Ling et al. |
| 6,201,831 | B1 | 3/2001 | Agazzi et al. |
| 6,226,332 | B1 | 5/2001 | Agazzi et al. |
| 6,249,544 | B1 | 6/2001 | Azazzi et al. |
| 6,252,904 | B1 | 6/2001 | Agazzi et al. |
| 6,253,345 | B1 | 6/2001 | Agazzi et al. |
| 6,272,173 | B1 | 8/2001 | Hatamian |
| 6,285,653 | B1 | 9/2001 | Koeman et al. |
| 6,297,647 | B2 | 10/2001 | Kirk et al. |
| 6,304,598 | B1 | 10/2001 | Agazzi et al. |
| 6,351,531 | B1 | 2/2002 | Tahernezhaadi et al. |
| 6,356,555 | B1 | 3/2002 | Rakib et al. |
| 6,433,558 | B1 | 8/2002 | Sciacero et al. |
| 6,463,041 | B1 | 10/2002 | Agazzi |
| 6,480,532 | B1 | 11/2002 | Vareljian |
| 6,493,448 | B1 | 12/2002 | Mann et al. |
| 6,584,160 | B1 | 6/2003 | Amrany et al. |
| 6,618,480 | B1 | 9/2003 | Polley et al. |
| 6,665,402 | B1 | 12/2003 | Yue et al. |
| 6,763,061 | B1 * | 7/2004 | Strait et al. ................. 375/219 |
| 6,912,209 | B1 * | 6/2005 | Thi et al. .................... 370/286 |
| 6,999,504 | B1 * | 2/2006 | Amrany et al. .............. 375/222 |
| 7,020,212 | B1 * | 3/2006 | Strait ......................... 375/260 |
| 7,058,140 | B2 * | 6/2006 | Smart et al. ................. 375/316 |
| 7,085,374 | B2 * | 8/2006 | Schulz ................... 379/406.01 |
| 7,224,725 | B2 * | 5/2007 | Kim ........................... 375/232 |
| 7,352,687 | B2 * | 4/2008 | Jones et al. ................. 370/201 |
| 7,376,074 | B2 * | 5/2008 | Jung et al. .................. 370/208 |
| 2001/0036160 | A1 | 11/2001 | Curran et al. |
| 2002/0067824 | A1 | 6/2002 | Wang |
| 2002/0106016 | A1 | 8/2002 | Egelmeers et al. |
| 2002/0191535 | A1 * | 12/2002 | Sugiyama et al. ........... 370/208 |
| 2002/0191552 | A1 | 12/2002 | Watkinson |
| 2003/0067888 | A1 | 4/2003 | Bina et al. |
| 2004/0001427 | A1 | 1/2004 | Belotserkovsky et al. |
| 2007/0237270 | A1 | 10/2007 | Mezer et al. |
| 2008/0151791 | A1 * | 6/2008 | LeBlanc ..................... 370/291 |

FOREIGN PATENT DOCUMENTS

| | | |
|---|---|---|
| JP | 2003-250193 | 9/2003 |
| JP | 2009-116472 | 5/2009 |
| KR | 10-2007-0018663 | 2/2007 |

OTHER PUBLICATIONS

Jamie E. Kardontchik, "4D Encoding in Level-One's Proposal for 1000BAS-T", Advanced Micro Devices, Aug. 21, 1997—Rev. B., pp. 1-24.

Erich F. Haratsch, et al., "A 1-Gb/s Joint Equalizer and Trellis Decoder for 1000BASE-T Gigabit Ethernet", *IEEE Journal of Solid-State Circuits*, vol. 36, No. 3, Mar. 2001, pp. 374-384.

Mehdi Hatamian, et al., "Design Considerations for Gigabit Thernet 1000Base-TTwisted Pair Transceivers", IEEE 1998 Custom Integrated Circuits Conference, pp. 335-342.

Gottfrie Ungerboeck, "Trellis-Coded Modulation with Redundant Signal Sets", *IEEE Communications Magazine*, Feb. 1987, vol. 25, No. 2, pp. 5-21.

"Gigabit Ethernet Over Category 5", Copyright 2000-2001 Agilent Technologies, 12 pages.

M.P. Sellers, et al., "Stablized Precoder for Indoor Radio Communications", *IEEE Communications Letters*, vol. 4, No. 10, Oct. 2000, pp. 315-317.

"Wirescope 350—Understanding ELFEXT", © 2000 Agilent Technologies, 2 pages.

David Crawford, "Adaptive Filters", © David Crawford 1996, pp. 1-5.

David A. Johns, et al., "Integrated Circuits for Data Transmission Over Twisted-Pair Channels", *IEEE Journal of Solid State Circuits*, vol. 32, No. 3, Mar. 1997, pp. 398-406.

Prof. David Johns, University of Toronto, "Equalization", © D.A. Johns 1997, 29 pages.

David Smalley, "Equalization Concepts: A Tutorial", Atlanta Regional Technology Center, Texas Instruments, Oct. 1994, pp. 1-29.

Shao-Po Wu, et al., "FIR Filter Design via Spectral Factorization and Convex Optimization", to appear as Chapter 1 of *Applied Computional Control, Signal and Communications*, Biswa Datta Editor, Birkhauser, 1977, pp. 1-33.

Richard D. Wesel, et al., "Achievable Rates for Tomlinson-Harashima Precoding", *IEEE Transactions on Information Theory*, vol. 44, No. 2, Mar. 1998, pp. 824-831.

Wolfgang H. Gerstacker, et al., "Blind Equalization Techniques for xDSL Using Channel Coding and Precoding", submitted to AEÜ Int. J. Electr. Commun., May 1999, pp. 1-4.

Chip Fleming, "A Tutorial on Convolutional Coding with Viterbi Decoding", © 1999-2002, Spectum Applications, pp. 1-6.

"ELFEXT—Introduction", Fluke Networks™, © 2000, pp. 1-2.

"Iowegian's dspGuru FIR FAQ Part 2: Properties", © 1999-2000 Iowegian International Corp., pp. 1-4.

Hiroshi Harashima, et al., "Matched-Transmission Technique for Channels with Intersymbol Interference", *IEEE Transactions on Communications*, vol. COM-20 No. 4, Aug. 1972, pp. 774-780.

M. Tomlinson, "New Automatic Equaliser Employing Modulo Arithmetic", *Electronic Letters*, vol. 7, 1971, pp. 138-139.

Peter Kabal, et al, "Partial-Response Signaling" *IEEE Transactions on Communications*, vol. COM-23, No. 9, Sep. 1975, pp. 921-934.

Robert F. H. Fischer, et al., "Dynamics Limited Precoding, Shaping, and Blind Equalization for Fast Digital Transmission Over Twisted Pair Lines", *IEEE Journal on Selected Areas in Communications*, vol. 13, No. 9, Dec. 1995, pp. 1622-1633.

Robert F. H. Fischer, et al., Comparison of Precoding Schemes for Digital Subscriber Lines', *IEEE Transactions on Communications*, vol. 45, No. 3, Mar. 1997.

"28.5 Protocol Implementation Conformance Statement (PICS) Proforma for Clause 28, Physical Layer Link Signaling for 10 Mb/s, 100 Mb/s and 1000 Mb/s Auto-Negotiation on Twisted Pair", *IEEE Std.* 802.3, 1998 Edition, pp. 6-14 and 18-44.

Gi-Hong Im, et al., "Performance of a Hybrid Decision Feedback Equalizer Structure for CAP-Based DSL Systems", *IEEE Transactions on Signal Processing* vol. 49, No. 8, Aug. 2001, pp. 1768-1785.

Eyuboglu M V., "Flexible Precoding for V.Fast", Data Transmission—Advances in Modem and ISDN Technology and Applications, 1992., UK, IEE, UK 1992, pp. 13-18.

* cited by examiner

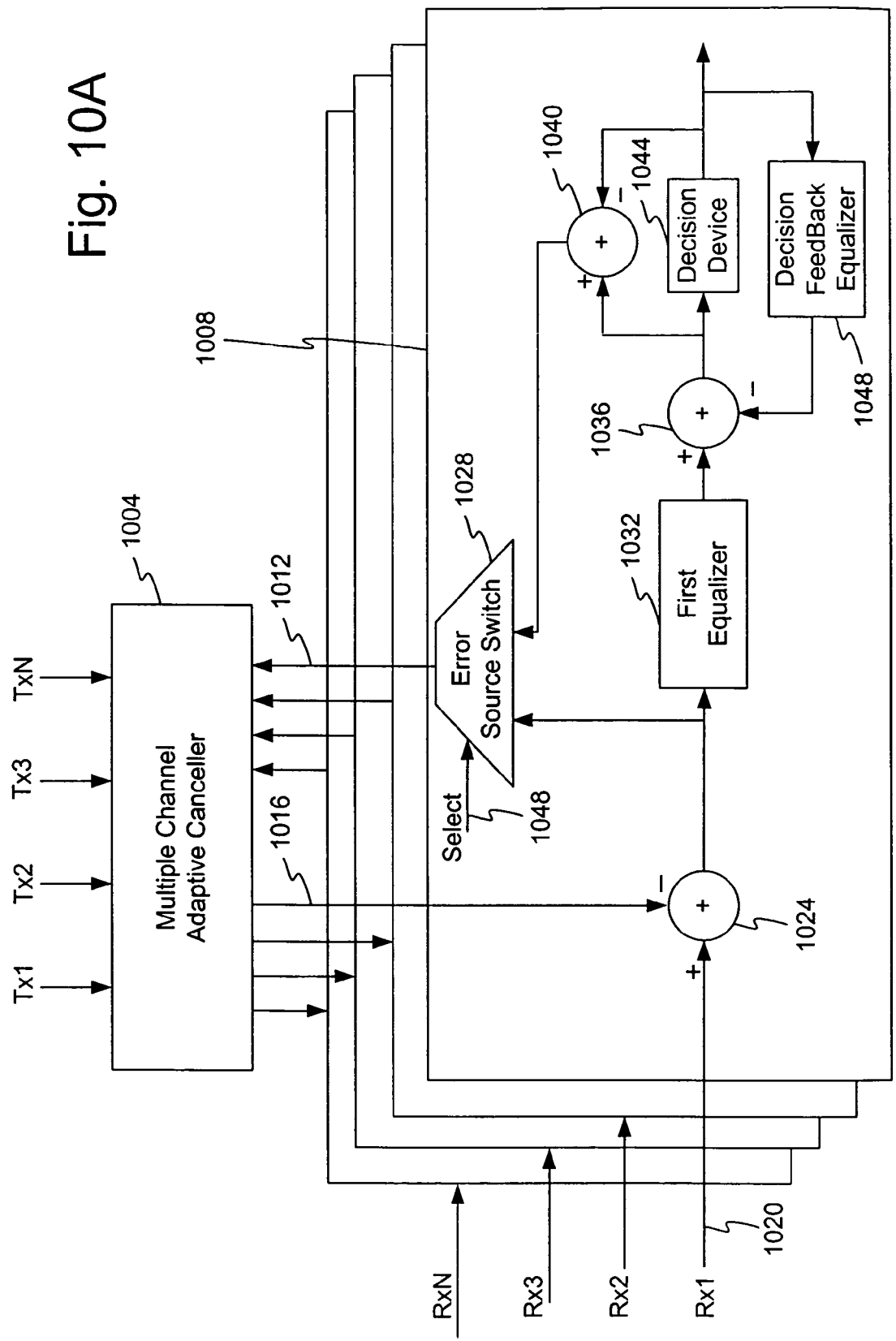

MULTIPLE CHANNEL INTERFERENCE CANCELLATION

PRIOR APPLICATION DATA

This application is a continuation of U.S. patent application Ser. No. 10/424,421 which was filed Apr. 28, 2003 and issued as U.S. Pat. No. 7,002,897 on Feb. 21, 2006.

FIELD OF THE INVENTION

The invention relates to electronic communications and, in particular, to a method and apparatus for interference cancellation in multi-channel environment.

RELATED ART

Electronic communication systems are a popular method to exchange information between remote locations. These systems are commonly referred to as data communication systems and are often arranged into networks. Any type of data may be transmitted over these communication systems. These networks may span the world, or be confined to a campus, building, or a single workroom. The computer network allows computers linked to the network to communicate.

As is commonly understood, there is a continuing need to increase the data communication rate. Certain communication systems are equipped with multiple channels between stations, and each station communicates using multiple channels. As a result, the total aggregate throughput is greatly increased as compared to systems that utilize a single channel. A particularly noteworthy example is in current 1000BASE-T and future multiple gigabit Ethernet, where all four twisted copper pairs of the Category 5 unshielded twisted pair (UTP) cable are used for transmission of data.

While multi-channel communication links speed data transfer, such systems suffer from drawbacks. One such drawback is that multi-channel communication links suffer from coupling. In particular, a portion of the signal transmitted on one channel will couple into an adjacent channel in the multi-channel system. This phenomenon is often referred to as near-end crosstalk (NEXT). Additionally, during full duplex operation, a signal transmitted on a particular channel will partially couple back into the reception on the same channel. This is referred to as echo.

In an ideal communication link, each channel of a multi-channel link would be completely decoupled from the other channels. Thus, each received signal would consist of the desired far end (FE) signal and a small amount of random noise. However, an ideal environment rarely exists, and hence the interference of NEXT and echo invades the signal that is received. Thus, the received signal is largely a combination of the far end signal and unwanted NEXT and echo components. This undesirably limits the detection of the far end signal such that some form of active interference cancellation must be implemented.

Interference cancellation is not, however, without drawbacks. Interference cancellation is complex, and implementation of interference cancellation in an electronic system requires a large degree of processing capability which for an integrated circuit has implications on area and power requirements.

In this regard, the prior art interference cancellation processing consumes an undesirably large amount of electrical power and generates an undesirable amount of heat. These factors lead to increase cost of ownership for products that incorporate prior art interference cancellation systems.

The complexity of this cancellation processing is compounded by the fact that at each station there are multiple receivers each receiving a far end signal, an echo and an interference signal from each of the other channels. Thus, in a multi-channel communication system having four channels, up to sixteen interference signals may need to be actively cancelled.

The most widely recognized technique for interference cancellation is an adaptive canceller, which is illustrated in FIG. 1, as part of a transceiver. A data source input 100 connects to an adaptive canceller 108 and a transmitter 112. The output of the transmitter 112 connects to the channel 116A. A receiver 120 of the transceiver also connects to a channel 116B. The term channel should be understood to mean one or more conductors of signal paths. The output of the receiver 120 feeds into a summing junction 124. The subtractor 124 subtracts the output of the adaptive canceller 108 from the received signal. The output of the subtractor 124 is provided as the input 128 to the other aspects of the receiver processing.

The coupling of interference from one transmitter into another receiver is represented as a linear transfer function H(s). Using the transmitted signal as a reference, the adaptive canceller 108, A(s), is trained such that A(s) approximately equals H(s). The output of the subtractor 124 then consists of the desired far end signal plus a residual interference term. Although desired to minimize the residual interference term, this goal may not be fully realized due to limitations in the required complexity of the adaptive canceller 108. Typically, the adaptive canceller 108, A(s), is realized in the discrete time domain so that the adaptive canceller 108 is implemented as a digital filter A(z). In this case, the transmitter 112 and receiver 120 blocks would consist of suitable mix-signal blocks needed to interface digital signals with the analog channel. Generally, the higher the order of this digital filter the greater the cancellation (smaller the residual). But, a high order filter undesirably incurs greater computational requirements. For the typical case where the digital filter used to derive A(z) is a tap delay line or FIR filter, the complexity is directly proportional to the number of taps, M.

Extending this structure to the multiple channel case, there would need to be $N_c^2$ digital filters, where $N_c$ is the number of channels. Thus, in a system operating under the current or future Ethernet standard and utilizing four channels, 16 digital filters would be required. In applications where the number of filter taps is large, the multiple channel extension of the typical canceller structure results in a formidable complexity requirement. For example, when extending the data rate and the length of the channels, the number of taps on an individual digital filter could rise to over four hundred taps. Combined with a high sampling rate and a multiple channel application, this many taps results in a huge requirement on the number of operations per second needed for realization. As can be appreciated, this prior art method and apparatus for echo cancellation and crosstalk mitigation are thus unsuitable for high-data-rate, multi-channel applications.

Accordingly, an improved method and apparatus for interference cancellation in a multi-channel communication system is needed. The method and apparatus described herein provides interference cancellation in a multi-channel communication system and overcomes the drawbacks of the prior art.

SUMMARY

The method and apparatus described herein may be utilized as part of or in conjunction with a communication system to reduce or eliminate crosstalk, coupling, or echo that may occur in a multi-channel configuration. In a multi-channel configuration, the processing may be consolidated to reduce complexity and increase speed and efficiency. In one embodiment, the processing occurs in a transform domain, such as the frequency domain, and as a result, efficiencies may be gained by combining cancellation signals prior to complex processing. This reduces the computational demands on the system.

A method and apparatus is disclosed for mixed signal cancellation wherein a portion of the crosstalk, coupling, or echo is canceled in the analog domain and a portion of the crosstalk, coupling, or echo is canceled in the digital domain. Mixed signal cancellation provides the benefit of reducing the amount or level of cancellation that must be performed in the digital domain, which in turn reduces the required number of bits in the analog-to-digital converter. Absent some level of cancellation in the analog domain, clipping or other form of distortion of the received signal may occur. At high data rates it may not be feasible to realize high speed, high resolution ADC operation.

In one embodiment, a method for reducing interference in an incoming signal received at a transceiver of a multi-channel communication device is disclosed. In this embodiment, the method receives, in a serial format, a signal to be transmitted over a channel. The system converts the signal to a parallel format and performs overlap processing on the signal and a Fourier transform on the signal to create a transform domain signal. Thereafter, the system multiplies the transform domain signal by one or more weighting variables to create a weighted transform domain signal. Next, the system performs an inverse Fourier transform on the weighted transform domain signal to create a cancellation signal. On this cancellation signal the system performs overlap processing and thereafter converts the cancellation signal to a serial format. The system then combines the cancellation signal with the incoming signal to reduce interference in the incoming signal.

There are numerous variations to this method of operation. In one embodiment, a cancellation signal is generated for each channel of the multi-channel communication system. In one embodiment, the method further comprises adding multiple cancellation signals such that the step of combining combines a cancellation signal from each channel with the incoming signal.

In another exemplary method of operation, a method for canceling interference in a received signal is provided. In this method, the system receives one or more outgoing signals and converts these signals to a transform domain to create one or more transform domain signals. Next, the operation processes the one or more transform domain signals and one or more weighting variables to generate one or more cancellation signals in the transform domain. In one embodiment, the transform domain comprises the frequency domain. Next, the system converts the one or more transform domain cancellation signals out of the transform domain to obtain one or more cancellation signals and combines the one or more cancellation signals with one or more received signals to cancel interference.

In various embodiments, the processing may comprise multiplying the transform domain signal with the weighting variable. Further, the multiplying may comprise an element by element multiply operation. In this method of operation, the process of receiving one or more outgoing signals may comprise receiving four outgoing signals and the process of combining the cancellation signal with a received signal may comprise combining four cancellation signals with a received signal. Hence, there may exist four received signals and each of the four received signals is combined with four cancellation signals. It is contemplated that the converting operation may comprise performing a Fast Fourier Transform on the outgoing signal.

In another embodiment, a cancellation system is disclosed for reducing crosstalk in a received signal in a multi-channel communication device. This system comprises an input for receiving an outgoing signal at a first transceiver. This input is connected to a transform unit which is configured to manipulate the output to a transform domain such as the frequency domain. One or more multipliers are configured to multiply the transform domain output with one or more weighting variables to create a cancellation signal in the transform domain. An inverse transform unit is configured to perform an inverse transform on the cancellation signal in the transform domain and a subtractor is provided and configured to subtract the cancellation signal from a received signal.

In variations on this system, the multipliers may comprise a processor. The system may further include or comprise one or more summing junctions configured to add the output of two or more multipliers to generate a combined cancellation signal and output the combined cancellation signal to the inverse transform unit. In one embodiment, the system further comprises an overlap processing module configured to perform overlap processing on the outgoing signal. In one particular embodiment, the system is enabled in a multi-channel communication device having four communication channels and the cancellation signal comprises four combined cancellation signals. Each of the four cancellation signals may comprise a cancellation signal from each of the four channels. One embodiment of the adaptation system includes an adaptation system configured to adaptively generate weighting variables. In one configuration, the adaptation system comprises a transform unit configured to convert an error signal to the transform domain and an adaptation module configured to process the error signal in the transform domain to generate the weighting variables.

In another embodiment, a cancellation system for canceling unwanted coupling in a multi-channel transceiver is disclosed. This embodiment comprises one or more inputs configured to provide an outgoing signal to the cancellation system. The system has one or more transform units configured to convert an outgoing signal to a transform domain and one or more multipliers configured to receive an outgoing signal in the transform domain and multiply an outgoing signal with a weighting variable to create one or more cancellation signals in the transform domain. Also part of this embodiment is one or more devices configured to combine two or more cancellation signals in the transform domain to create one or more combined cancellation signals in the transform domain and one or more inverse transform units configured to receive the one or more combined cancellation signals and reverse the processing of the one or more transform units.

It is contemplated that the one or more transform units and the one or more inverse transform units may perform overlap processing and transform processing. The system may further comprise two or more devices configured to combine the one or more cancellation signals in the transform domain. In one embodiment, the transform units perform any type of Fourier transform and the inverse transform units perform any form of inverse Fourier transform. Similarly, the weighting variables may be generated by an adaptation system and the adaptation system may be shared between two or more channels.

Also disclosed is a method for generating a cancellation signal for use in a cancellation system. This method comprises receiving at a cancellation system one or more signals, wherein the one or more signals relate to one or more outgoing signals on one or more of the channels in the multi-channel communication system. The method then processes the one or more signals to convert each of the one or more signals into a transform domain and provides the one or more signals in the transform domain to one or more multipliers associated with the channel. Thereafter, the method multiplies the one or more signals in the transform domain by one or more weighting variables and combines the outputs of the one or more multipliers to create a transform domain cancellation signal. Finally, processing may occur on the cancellation signal in the transform domain to take the cancellation signal out of the transform domain to create a cancellation signal.

In various embodiments, the channel comprises a two conductor signal path. In one embodiment, the transform domain comprises the frequency domain. The method may also involve generating the one or more weighting variables based on a feedback error signal resulting from a combination of the cancellation signal with a received signal.

Also disclosed herein is a system for generating a weighting variable for use by a transform domain processing module in an interference cancellation system. This embodiment comprises a first input configured to receive a feedback signal and a second input configured to receive a data signal. Connected to the inputs is a transform unit configured to receive either or both of the feedback signal and the data signal and transform either or both of the feedback signal and the data signal into a transform domain. An adaptation module is configured to process the feedback signal and the data signal to generate one or more weighting variables.

In this system, the transform domain processing module may comprise one or more multipliers and the transform unit may be configured to perform a Fourier transform. In one embodiment, the transform domain is a domain in which multiplication between a data signal and one or more weighting variable is generally equivalent to convolution. In a multi-channel environment, the system may be shared by two or more channels and the system may further perform time multiplexing of weighting variables.

Also disclosed herein is an interference cancellation system configured to perform cancellation utilizing signals that are either analog domain signals or digital domain signals, or both. In one embodiment, this system comprises a first input configured to receive an incoming signal and a second input configured to receive a cancellation signal. The system provides the cancellation signal to a mixed signal processing system. The system also comprises an analog domain cancellation system. The analog domain cancellation system comprises a signal separation unit which is configured to separate the cancellation signal into first portion and a second portion. A digital to analog converter is included and configured to convert the first portion of the cancellation signal into the analog domain. A first subtractor is configured to subtract the analog cancellation signal from the incoming signal to create a modified incoming signal. Also part of the system is an analog to digital converter configured to convert the modified incoming signal to the digital domain and a second subtractor configured to subtract the second portion of the cancellation signal from the modified incoming signal in the digital domain.

In various embodiments, the value of the first portion of the cancellation signal is larger than the value of the second portion of the cancellation signal. In one embodiment, the analog domain cancellation system cancels interference in the analog domain to reduce the dynamic range requirements of the analog to digital converter. It is also contemplated that the cancellation signal is a cancellation signal configured to cancel interference from other signals on two or more channels that coupled into the receive signal. In one embodiment, this system further comprises a switching apparatus configured to selectively enable cancellation in the analog domain.

Also disclosed herein is a mixed signal cancellation system configured to cancel interference that couples onto a received signal in a multi-channel communication system. In one embodiment, this system comprises a digital domain cancellation system configured to generate a first digital domain cancellation signal. Also part of this system is a mixed domain cancellation system configured to process the first digital domain cancellation signal and generate an analog domain cancellation signal and a second digital domain cancellation signal. A switching apparatus is provided and configured to selectively combine, with the received signal, either the first digital domain cancellation signal or both the second digital domain cancellation signal and the analog domain cancellation signal.

In one embodiment, the digital domain cancellation system performs processing in a transform domain to generate the first digital domain cancellation signal. In one embodiment, the switching apparatus comprises a multiplexer. Canceling a portion of the interference in the analog domain reduce dynamic range requirements of a receiver's analog to digital converter. It is also contemplated that the multi-channel communication system may comprise a four channel communication system and each channel may comprises two conductors.

In addition to a system being disclosed, also disclosed is a method for canceling unwanted coupling in the analog domain in a received signal to reduce the requirements of a receiver's front-end processing. In one embodiment, this method comprises receiving a cancellation signal in the digital domain from a multi-channel cancellation signal generator and processing the cancellation signal to isolate one or more most significant bits and one or more least significant bits. Thereafter, this method converts the one or more most significant bits from the digital domain to the analog domain to create an analog domain cancellation signal. Next, this method subtracts the analog domain cancellation signal from the received signal to create a modified received signal and then converts the modified received signal to the digital domain. Then the method subtracts the one or more least significant bits from the modified received signal in the digital domain.

In one variation of this method, the multi-channel cancellation signal generator performs processing in the transform domain to generate the cancellation signal. Reducing the requirements of a receiver's front-end processing comprises reducing the required dynamic range of an analog to digital converter in the receiver. In one embodiment, the one or more most significant bits comprise the analog cancellation signal and one or more least significant bits comprises the digital cancellation signal. It is further contemplated that this method may also comprise monitoring the magnitude of the received signal and controlling a switching apparatus to selectively subtract the one or more most significant bits from the received signal.

In another embodiment, a method for canceling unwanted coupling in a signal received over a communication channel is disclosed. This method comprises generating a cancellation signal and providing the cancellation signal to a mixed signal cancellation system. Thereafter, this method separates the cancellation signal into a first portion and a second portion and subtracts the first portion, in an analog format, from the received signal and subtracts the second portion, in a digital format, from the received signal. It is contemplated that subtracting the first portion and the second portion comprises canceling unwanted coupling in the received signal.

In a variation of this method, the first portion comprises one or more of the most significant bits of the cancellation signal and subtracting the first portion further comprises converting the first portion to an analog format. It is also contemplated that the method may further comprise selectively enabling cancellation in the analog domain by comparing the magnitude of the cancellation signal to a threshold value such that if the magnitude of the cancellation signal exceeds a threshold value and then enabling cancellation in the analog domain. As a benefit of this method, it is less likely that the capability of the receiver will not be exceeded when processing a received signal having a magnitude at or below the threshold value.

In addition, in one embodiment the method is further configured to generate a cancellation signal by performing processing in a transform domain to manipulate outgoing signals on the two or more channels to generate a cancellation signal that cancels unwanted coupling from the two or more channels. In one embodiment, the method may subtract the second portion, in a digital format, from the received signal and may digitally filter the second portion prior to subtracting. The mixed domain cancellation system may further comprise a residual canceller. In addition, the residual canceller may comprise a digital filter that is configured to modify the second digital domain cancellation signal to account for delay or time dispersion in the analog domain cancellation signal. This method may further comprise performing digital filtering on the one or more least significant bits to account for creating the modified received signal and converting the modified received signal to the digital domain. Likewise, the method may also comprise performing residual cancellation utilizing a digital filter on the second portion prior to subtracting the second portion from the received signal.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIGS. 10A and 10B illustrate block diagrams of example embodiments having an error signal source selector.

DETAILED DESCRIPTION

Figure 1:
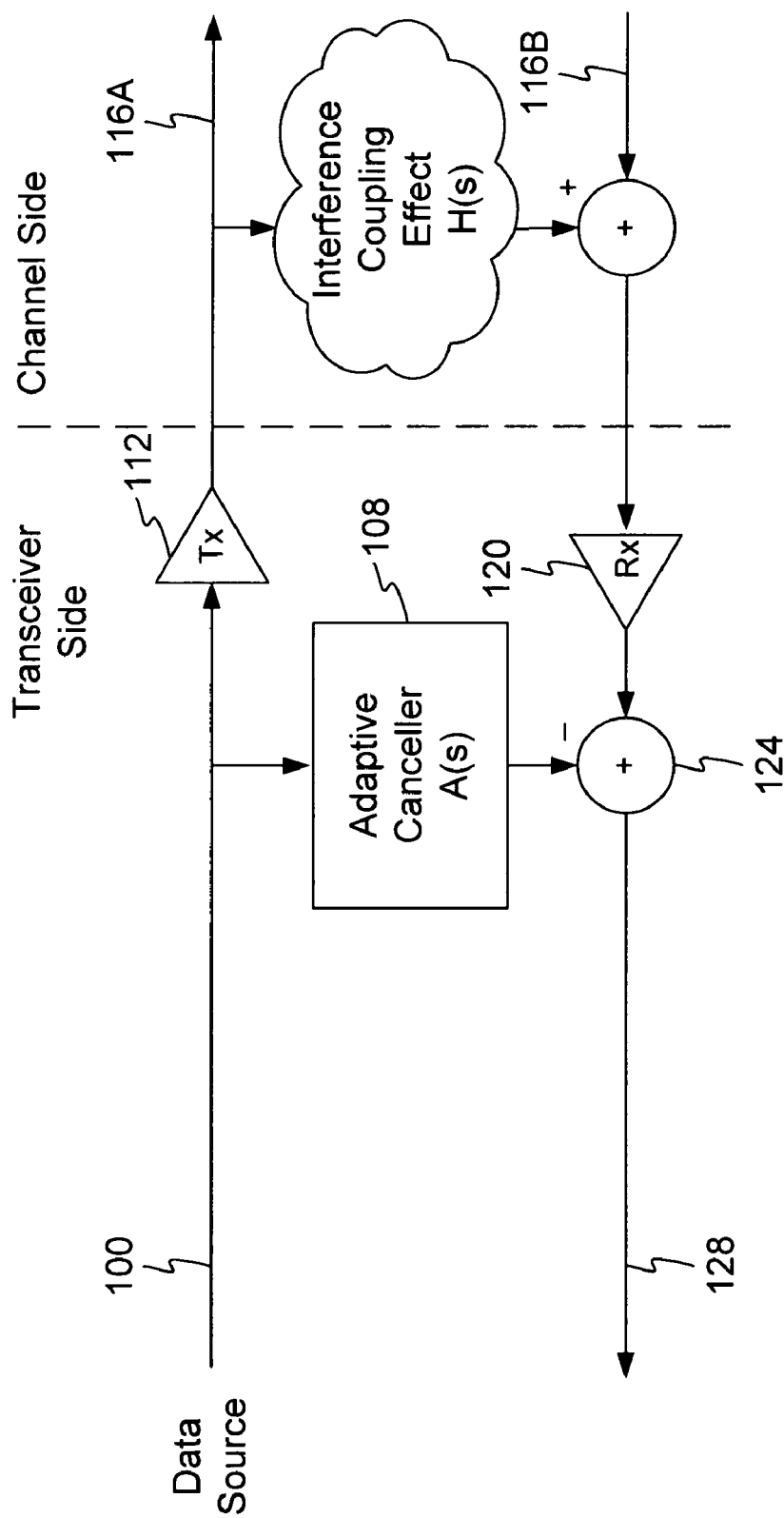
FIG. 1 illustrates a block diagram of a prior art canceller system.
Figure 2:
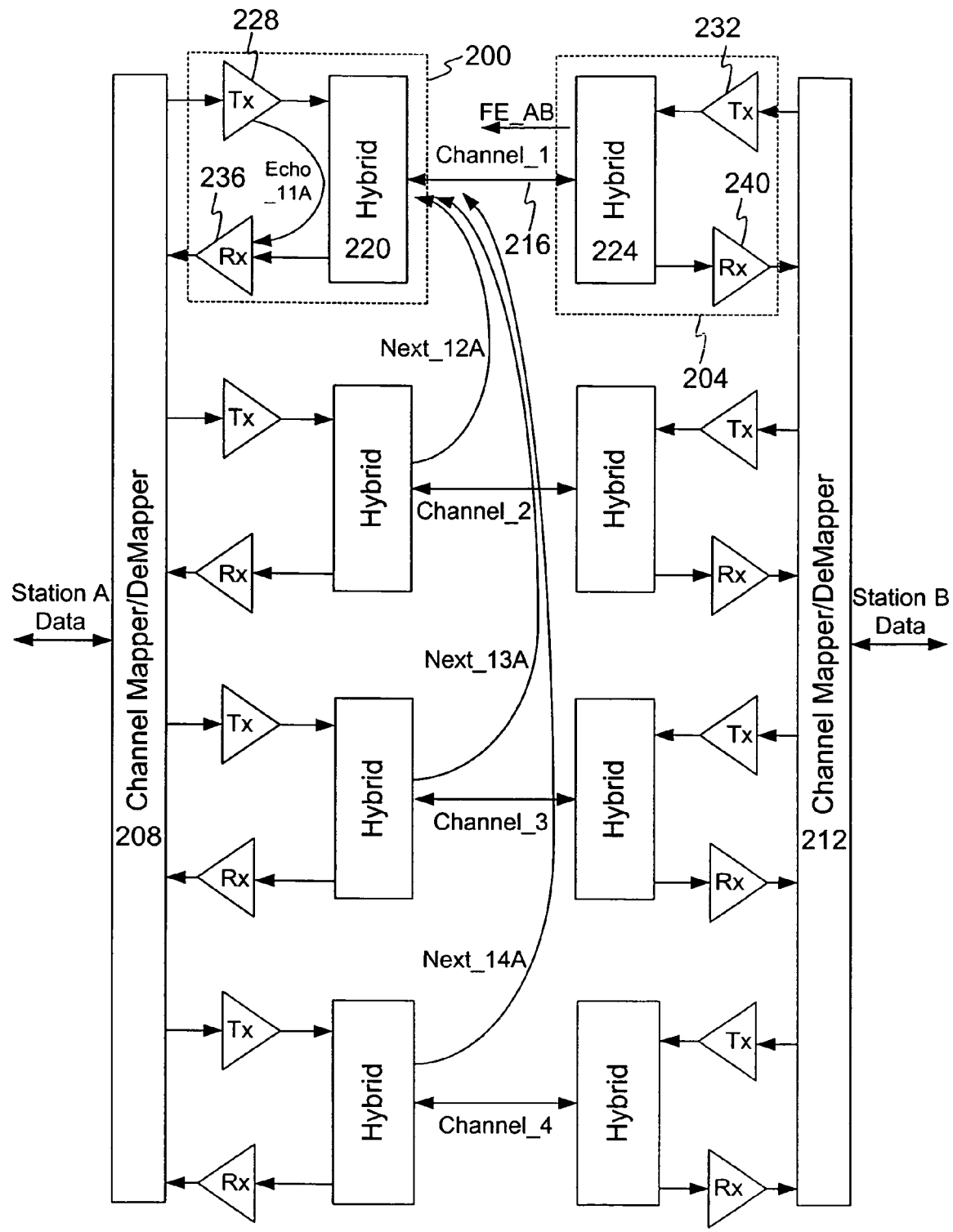
FIG. 2 illustrates a block diagram of an example embodiment of a multi-channel transceiver.

FIG. 2 illustrates the sources of interference into receiver 1 of station A. As shown, a first transceiver 200 is configured to communicate with a second transceiver 204. The first transceiver is associated with station A while the second transceiver is associated with station B. It is contemplated that the transceivers 200, 204 are incorporated within communication devices configured to communicate utilizing a multi-channel communication link. For purposes of understanding, the transceivers may connect to mapper/demapper modules 208, 212 as shown. Although shown as having four communication channels, it is contemplated that the method and apparatus discussed below may be expanded to any number of channels. In addition, the term channel should be understood to mean any medium capable of carrying a signal or data, such as but not limited to, any Category twisted pair (UTP) cabling either shielded or unshielded (e.g., 5, 5e, 6, 7 . . . etc.), wireless channels, fiber optic channels or cables, free-space optic channels, voice grade twisted pair conductors, coaxial cables, or other channels or conductors that are currently or that may become available in the future. In addition, it is contemplated that the principles disclosed and claimed herein may also be utilized with any type of channel, including those listed above, when grouped into multi-conductor channels. For example, it is contemplated that standard telephone lines or any other type conductor or transmission medium may be grouped into bundles to create a multi-conductor channel. The processing of signals transmitted over such channels may be performed in accordance with the teachings contained herein.

A channel 216 connects the first transceiver 200 and the second transceiver 204. Each transceiver 200, 204 may comprise a hybrid 220, 224, a transmitter 228, 232, and a receiver 236, 240. A signal FE_AB is transmitted from the second transceiver 204 (station B) to the first transceiver 200 (station A) over channel 1. The term 'signal FE_AB' should be understood to mean the far end signal, with respect to station A, being transmitted to station A from station B. It is desired to isolate and process at the first transceiver 200 only the FE_AB signal that was transmitted.

Also shown in FIG. 2 are the echo and near-end crosstalk (NEXT) components that are undesirably coupled into the first channel 216 and are received by the receiver 236. Namely, echo component echo_11A is the echo interference coupled onto channel 1 from channel 1. The term echo_11A should be interpreted to mean the echo components that couple onto the first channel from the first channel of station A. Component Next_12A is the interference coupled onto channel 1 from channel 2 on the signal that is received at station A. This pattern repeats as shown for each of the other channels. Hence, Next_13A and Next_14A are the interference sources coupled onto channel 1 from channels 3 and 4 respectively. As a result of the coupling, the signal received at the first transceiver 200 consists of the desired far end signal, FE_AB, and the four interfering signals, i.e., the three NEXT signals and the echo. This pattern repeats for each of the channels. It is desired to remove the respective NEXT and echo signals on each of the received signals in each of the receivers at both station A and station B.

In many situations, the communication system performance is interference limited such that the presence of interference, such as echo and crosstalk, limits communication rates. The interference often creates data errors during the processing of a received signal which limits transmission rates. If the interference is left in the signal, the data can often not be recovered or detected. Hence, the interference may be a limiting factor.

It is further contemplated that the transmit rate for the systems described herein may be at any frequency. As is understood, processing and transmission at high frequencies may create additional complexities that may be solved by the teachings contained herein. It is contemplated that the principles disclosed and claimed herein may be utilized with systems operating at any frequency from very low frequencies up to and including multiple giga-bit processing or transmit rates.

Figure 3:
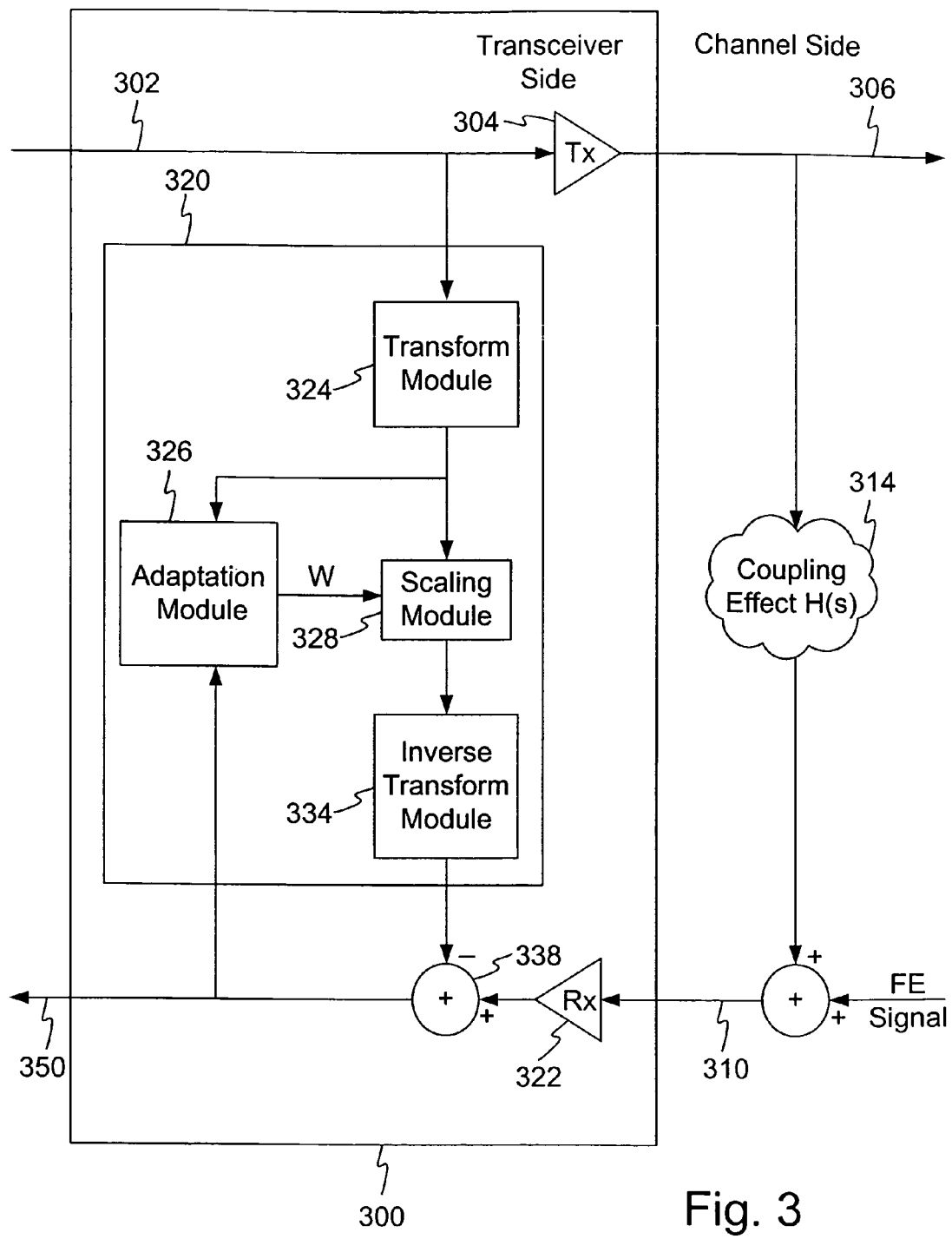
FIG. 3 illustrates a block diagram of an example embodiment of the invention.

FIG. 3 illustrates a block diagram of an example embodiment of one embodiment of the invention. In this example embodiment, the undesirably long analog or digital filters of the prior art are replaced with systems that transform the transmitted signal to a transform domain in which processing may occur. As a result, the complexity of echo and crosstalk reduction is greatly reduced. The term transform domain is defined to mean an alternative domain that is different from the original domain.

One example embodiment of a system configured to perform transform domain processing is a system configured to perform the processing in the frequency domain, which is shown in FIG. 3. It is contemplated that numerous systems of this nature may reside in a multi-channel communication device to reduce or eliminate echo and crosstalk that couples across channels. A first transceiver 300 is shown for purposes of discussion. A data source line 302 from a data source (not shown) connects to a transmitter 304 and an adaptive canceller module 320. The transmitter 304 comprises one or more devices configured to transmit the data from the data source over the channel to a second transceiver at a remote location.

As part of the transmission, it is contemplated that at least a portion of echo and crosstalk will couple onto an input 310 to the first transceiver 300. This is represented in FIG. 3 for purposes of discussion as an input coupling effect 314, having a transfer function H(s), which is combined into the received signal on input 310. Thus, the signal on input 310 comprises a far end signal (FE signal) and a signal due to the coupling, H(s), from channel 306 in the multi-channel communication system. If other channels were present, additional coupling signals would also be present on the received signal. It is desired to remove the component due to the coupling H(s) from the received FE signal. The signal received on input 310 connects to a receiver 322, which performs standard processing on the signal. The output of the receiver 322 feeds into a subtractor 338.

An adaptive canceller system 320 is configured as part of the first transceiver. In the embodiment of FIG. 3, the line 302 to the adaptive canceller system 320 connects to a transform module 324. In one embodiment, the line 302 is configured to receive an outgoing signal from a data source. The outgoing signal is eventually or concurrently provided to the transmitter 304 for transmission over the channel 306. The transform module 324 comprises a configuration of hardware, software, or both configured to processes a signal into a transform domain. The transform domain and the transform module 324 are discussed below in more detail. The output of the transform module 324 feeds into an adaptation module 326 and a scaling module 328. In one embodiment, the adaptation module 326 comprises a configuration of hardware, software or both configured to operate in and perform the functions described herein. The adaptation module 326 performs processing to dynamically generate weighting variables based on an estimate of the transfer function of the crosstalk coupling effect. The scaling module 328 comprises software, hardware or a combination of both configured to perform scaling on the transform signal responsive to the weighting variables. In another embodiment, the scaling module 328 may comprise a multiplier. The output of the scaling module 328 connects to an inverse transform module 334, which in turn has an output connected to the subtractor 338. The inverse transform module 334 comprises hardware, software, or a combination of both configured to reverse the transform operation. In one embodiment, this comprises returning the input to the inverse transform module 334 to the same domain as which the outgoing signal was in prior to transform processing by the transform module. In one embodiment, this comprises an inverse Fourier transform operation.

The subtractor 338 subtracts the output of the adaptive canceller system 320 from the received signal to thereby isolate the desired FE signal. The output of the subtractor 338, which comprises the FE signal or a signal generally similar to the FE signal, is provided as one output 350 from the transceiver 300 and as a feedback signal, for purposes of adaptation, to the adaptation module 326.

In operation, the adaptive canceller system 320 reduces the echo and the crosstalk components in the received signal. The transceiver 300 receives a signal on an output 302 to be sent over the channel 306. To reduce the echo and the crosstalk components, the signal is provided to both the transmitter 304 and the adaptive canceller system 320. The transmitter 304 processes the signal and outputs the signal onto the channel 306. During operation, the receiver 322 receives a composite signal on input 310 comprised of the FE signal and a signal coupled through H(s). The receiver 322 processes these inputs in a manner known in the art. To remove the coupled signal, the adaptive canceller system 320 is configured with transfer function that approximates the coupling function H(s). The output of the adaptive canceller system 320, herein after the cancellation signal, is subtracted from the received signal to isolate the FE signal.

To generate the cancellation signal, the input transmit signal from output 302 is subject to a transform operation in the transform module 324 to create a transformed signal. The scaling module modifies the transformed domain signal based on a weighting variable W that is generated by the adaptation module 326. The scaling module 328 utilizes the weighting variable to perform processing on the transform domain signal to generate a cancellation signal. Stated another way, the weighting variables realize the transfer function of the scaling module 328 to cause the scaling module to generate the desired cancellation signal. In one embodiment, the scaling module 328 multiplies the transform domain signal and the weighting variable to generate the one or more cancellation signals.

In one embodiment, calculation of the weighting variable by the adaptation module 326 occurs based on the least mean square (LMS) algorithm and feedback from the signal on line 350. Manipulation of the weighting variable modifies the cancellation signal, which in turn modifies the output of subtractor 338. As a result, the feedback to the adaptation module 326 is also modified to allow the adaptive canceller system 320 to adapt to the changes in crosstalk and echo. It is contemplated that other forms of adaptation may be utilized other than LMS, such as but not limited to stochastic gradient, constrained LMS, Recursive Least Squares (RLS), Fast Kalman, Gradient Lattice and Least Squares Lattice.

Thereafter, the output of the scaling module 328 is subject to an inverse transform operation, to return the signal to the original domain. This cancellation signal, restored to the original domain, is provided to the subtractor 338, where it is subtracted from the receiver output thereby removing the crosstalk signal from the received signal and isolating the FE signal.

Figure 4:
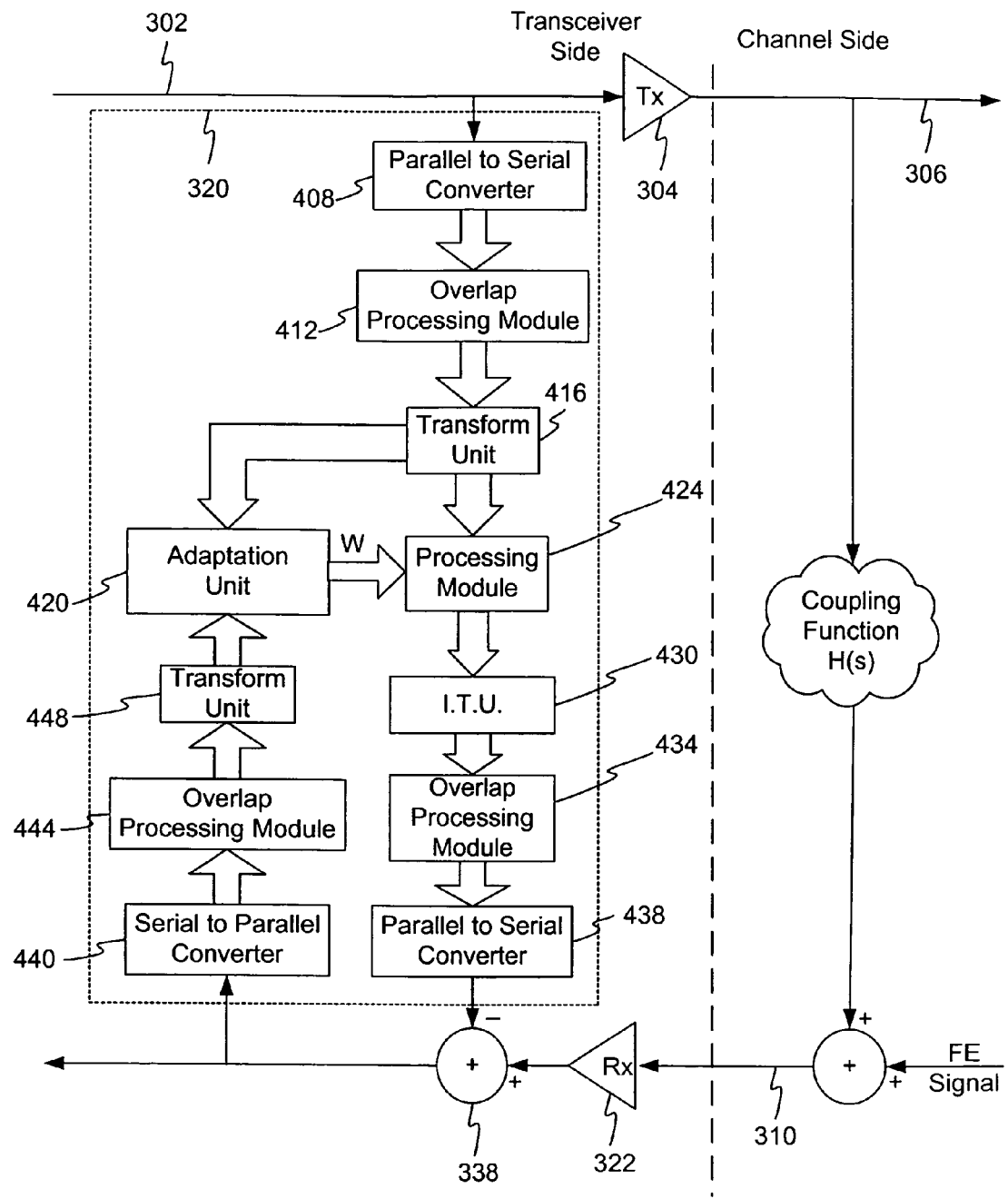
FIG. 4 illustrates a block diagram of an exemplary embodiment of the adaptive cancellation system.

FIG. 4 illustrates a block diagram of an exemplary embodiment of the adaptive cancellation system 320 shown in the transceiver of FIG. 3. Aspects of FIG. 4 are similar to FIG. 3 and hence, identical elements are referenced with identical reference numerals. The aspects of the adaptive canceller system 320 are now described in more detail. The input signal, to the cancellation system 320, on line 302 connects to a serial to parallel converter 408, which in turn connects to an overlap processing module 412. The signal on line 302 may comprise a signal to be transmitted to a remote station, such as station B from FIG. 2.

The serial to parallel converter 408 may comprise any device or system that converts the serial input on line 302 to two or more parallel lines. In one embodiment, the serial to parallel converter 408 comprises a de-multiplexer. Conversion to the parallel format aids in processing, such as conversion to the transform domain, of the signals while satisfying system time constraints.

The overlap processing module 412 comprises a combination of hardware, software, or both, configured to modify the signals that are subject to the transform. The overlap processing as described herein reduces distortion that would otherwise be generated by the transform process in the absence of such overlap processing. Overlap methods assist in achieving true linear convolution from the cyclic convolution of the fast Fourier transform. Any form of overlap processing may occur. Two such overlap methods comprise overlap-and-save (OAS) and overlap-and-add (OAA). In one embodiment, the overlap is a ⅝ overlap, although it is contemplated that 50% overlap or any other type of overlap processing may occur.

The overlap processing module 412 output feeds into the transform unit 416, which in one embodiment comprises a Fast Fourier Transform (FFT) unit. The mathematical operation of the FFT is understood by one of ordinary skill in the art, and hence the FFT unit is not discussed in detail herein. The output of the transform unit 416 comprises the input signal in the transform domain. With proper overlap methods, this can be realized in the frequency domain with computationally efficient Fast Fourier Transforms (FFT). It is contemplated that other methods of transforming the signal into an alternative domain are also available. These include, but are not limited to, Hadamard transform, Cosine transform, Walsh transform and Sine transform.

The output of the transform unit 416 connects to a processing module 424 and an adaptation block 420. The adaptation block 420 calculates one or more weighting variables W that are provided to the processing module 424. The processing module 424 may comprise any configuration of hardware, software, or both configured to generate a cancellation signal. In one embodiment, the processing module 424 comprises a processor or digital signal processor. In one embodiment, the processing module 424 comprises a multiplier configured to perform a multiplication operation in the transform domain that yields a result that could be arrived at by convolution of the received inputs in the time domain. The processing module 424 uses the weighting variables to scale the inputs provided to the processing module 424. It is contemplated that a parallel input is provided to the processing module 424; any number of weighting variables may also be provided to the processing module. In one embodiment, the processing occurs in the transform domain, and hence the processing module 424 yields a result that may be considered equivalent a convolution in the time domain. In this embodiment, multiplication in the frequency domain yields a result generally equivalent to convolution in the time domain.

In one embodiment, the weighting variables may comprise the variables $\{WV_0, WV_1, WV_2, WV_3, WV_4, \ldots WV_X\}$. The output from the transform unit 416 may comprise $\{TD_0, TD_1, TD_2, TD_3, TD_4, \ldots, TD_X\}$, and the resulting output from the multipliers may comprise $\{WV_0*TD_0, WV_1*TD_1, WV_2*TD_2, WV_3*TD_3, WV_4*TD_4, \ldots WV_X*TD_X\}$. Thus, it can be seen that in one embodiment the multiplier occurs on a component-by-component basis.

This approach exploits the transform property that cyclic convolution in the time domain, although much different in operation and theory, yields a result that is mathematically equal to multiplication in the transform domain. Depending on the number of taps in the time domain filter, the complexity reduction of using the FFT, IFFT and frequency tap (vector) multipliers versus the time domain tap delay line can be as much as an order of magnitude. This is a significant advantage over systems not utilizing this method of operation. Moreover, the FFT and IFFT may be executed in the digital domain to increase efficiency. It is also contemplated that Fourier optics may be utilized to realize equivalent processing.

There are numerous techniques available for realizing the FFT and IFFT, such as but not limited to, Cooley-Tukey, Goertzel, Good-Thomas and Winograd. In one example embodiment, the Cooley-Tukey method is enabled. Moreover, it is contemplated that decimation-in-time or decimation-in-frequency may occur. In one embodiment, decimation-in-frequency occurs for the FFT while decimation-in-time occurs for the IFFT. In one example implementation, the parameterization of the FFT/IFFT processes 1024 real samples with a 512 point complex FFT/IFFT. In this implementation example, overlap and save processing may occur as described herein. By way of example, such an implementation example may process 640 new samples in each block. An equivalent processing structure based on prior art principles of processing in the time domain would require 385 filter taps. Hence, a significant advantage is realized. In addition, it is also contemplated that the method and apparatus described herein may be utilized to process not only signals that originate as real signals, but also signals that originate as complex signals. For example, the processing of complex signals in a wireless communications environment may occur based on the teachings contained herein.

The output of the multiplier 424 feeds into an inverse Fast Fourier Transform unit 430, which reverses the Fourier transform operation to thereby return the signal to the time domain. As an advantage of the method and apparatus described herein, the Fast Fourier Transform and inverse Fast Fourier Transform may be utilized to reduce computational complexity and speed of operation. The output of the inverse Fast Fourier Transform unit (ITU) 430 connects to an overlap processing module 434 which operates in the manner described above in conjunction with FFT module 412. The overlap processing module 434 provides the time domain signal to the parallel to serial converter 438. In one embodiment, the parallel to serial converter 438 comprises a multiplexer.

The serial output of the parallel to serial converter 438 feeds into the subtractor 338 to be subtracted from the output of the receiver 322. The processing of the adaptation block weighting variable W combined with multiplication in the frequency domain, or any transform domain, generates a signal capable of canceling the unwanted coupling that is combined with the FE signal.

The output of the subtractor 338 is provided to subsequent processing systems of the transceiver or communication system. The output of the subtractor 338 is also provided to a serial to parallel converter 440 that converts the input to a parallel signal and provides the parallel signal to an overlap processing module 444. The output of the overlap processing module 444 undergoes a Fourier transform operation in a Fast Fourier Transform unit 448 to convert the signal to the frequency domain. The output of the Fast Fourier Transform unit 448 is provided to the adaptation unit 420 as a feedback control signal. The adaptation unit 420 also receives the output from the transform unit 416.

Of particular importance is conversion of the input signal by the transform units 448, 416 to the transform domain, such as the frequency domain, so that cyclic convolution in the time domain yields a result that is mathematically equal to multiplication in the frequency domain. Domains other than the frequency domain may realize similar properties. Hence, the scope of the claims should not be limited to Fourier transforms or transforms that result in transformation to the frequency domain.

In one embodiment, the adaptation unit 420 executes least mean squared (LMS) adaptation to generate the weighting variables. The LMS adaptation may be constrained or unconstrained. In one embodiment, the unconstrained process is preferred as it eliminates an extra FFT/IFFT block pair and may perform more effectively. Through adaptation, the desired weighting variables may be arrived at to cancel all or a portion of the unwanted crosstalk and echo. Thus, the signal path through devices 440, 444, 448, 420 operate as a feedback path of a servo control system. In one embodiment, the number of weighting variables is related to the size of the transform unit 416 output.

Operation of the example embodiment shown in FIG. 4 is similar to operation of the embodiment shown in FIG. 3, and hence a detailed discussion regarding operation is not repeated. In summary, through processing of the input signal on line 302, the adaptive cancellation system 320 generates a cancellation signal that may be used to cancel one or more of the crosstalk or echo on the received signal.

Figure 5:
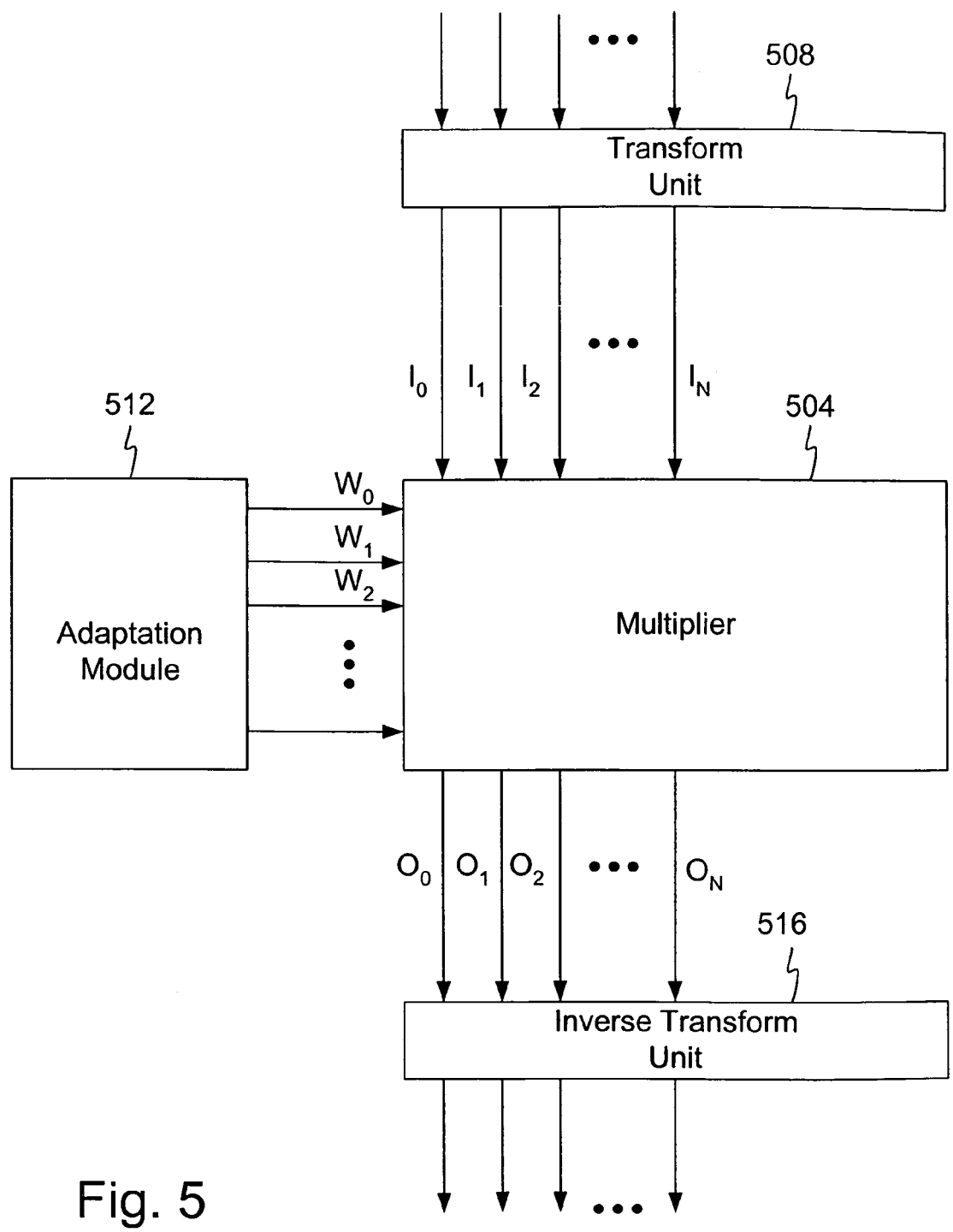
FIG. 5 illustrates a block diagram of the parallel line structure of the multiplier and its associated devices.

FIG. 5 illustrates a block diagram of the parallel line structure of the multiplier and its associated devices. As shown, the multiplier 504, such as multiplier 424 shown in FIG. 4, receives inputs $I_0$-$I_N$ from an FFT unit 508. The variable N may comprise any positive integer value, and hence the principles discussed herein are applicable with any number of parallel lines. The multiplier 504 also receives weighting variables $W_0$-$W_N$ from an adaptation module 512. The multiplier 504 has outputs $O_0$-$O_N$ that provide the result of the multiplication to the IFFT unit 516. The multiplier performs multiplication in the frequency domain, in this example embodiment, the domain resulting from the FFT operation. In one embodiment, this operation provides a result equal to cyclic convolution. It is contemplated that the multiplication of the weighting variables occurs on a component-by-component basis and that each weighting variable may comprise a different value. Thus, the multiplication may occur as $W_0 \times I_0$, $W_1 \times I_1$, up to the value N. In addition, the multiplier may have a shared multiplier such that a single multiplier may be utilized for more than one line, or may possess up to N number of different multipliers.

As an advantage to the method and apparatus disclosed in FIGS. 3, 4, and 5, a reduction in complexity is realized by multiplication in a frequency domain, such as the transform domain obtain from a Fourier transform. In systems of the prior art, a multi-tap, time-domain filter may have been required. However, utilizing processing in the transform domain one or more multiplication operations need only be performed. This may realize a 10-fold advantage in terms of complexity.

Figure 6:
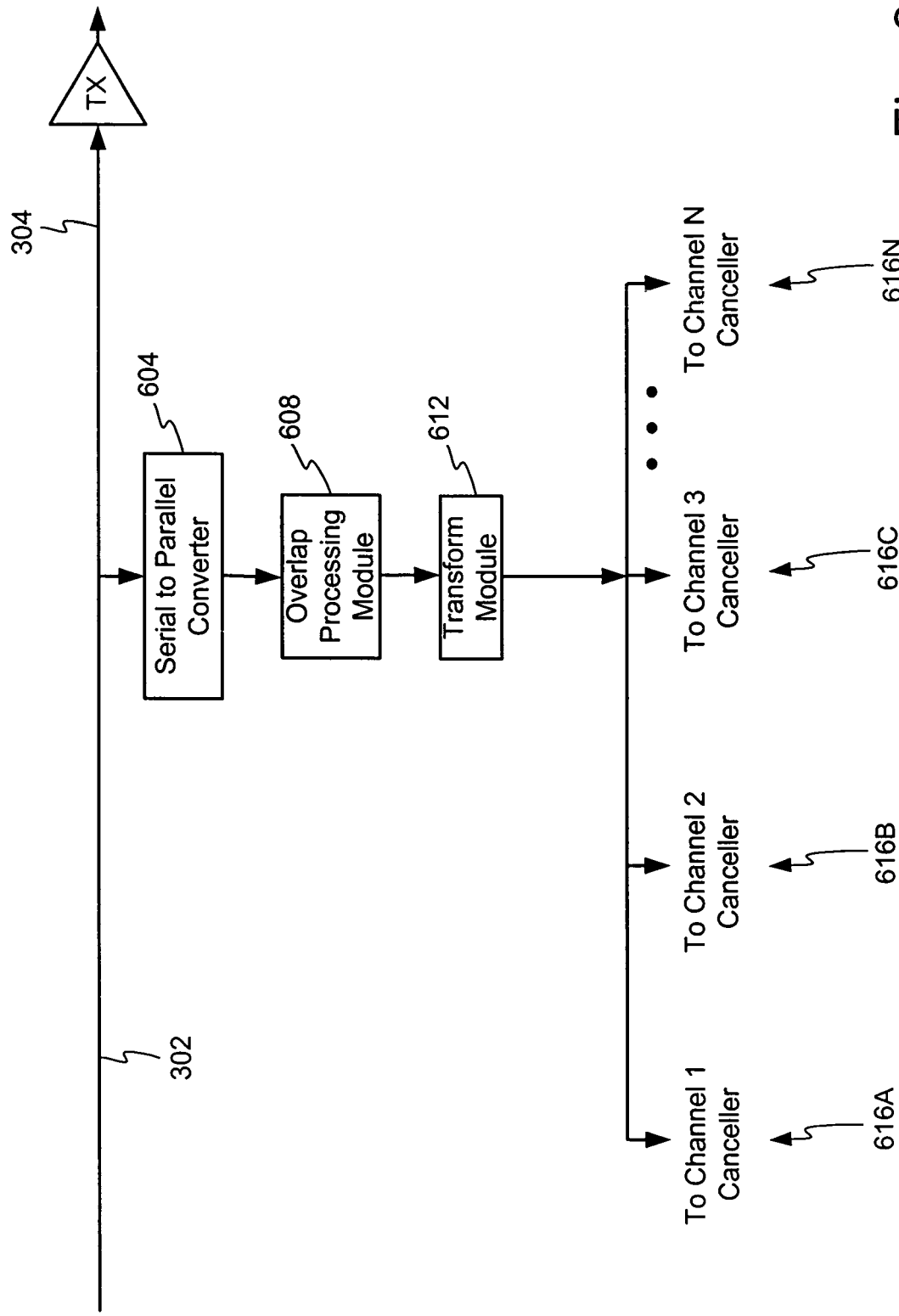
FIG. 6 illustrates a block diagram of an example embodiment of the consolidated transmit side processing system in a multi-channel environment.

In addition to the reduction in complexity, space requirements, and computational demands, the principles described above may be applied to multi-channel configurations. In addition, by exploiting the properties of the transform domain, additional benefits may be realized. FIG. 6 illustrates a block diagram of an embodiment of the consolidated transmit side processing system in a multi-channel environment. This embodiment builds on this complexity savings by exploiting the multiple channel environment to realize a major reduction in complexity and size. In general, a transmit signal is being used as a reference into several cancellers to eventually generate transform outputs for each of the channels into which it is disturbing. The transform outputs are scaled by weighting variables to generate cancellation signals to cancel the echo or crosstalk that is received at a particular transceiver. Thus, the first transceiver for channel 1 would generate a transform output for each receiver associated with channels 1 through 4. Likewise, each of the other transmitters in a multi-transceiver communication system would likewise generate four transform outputs. These principles may be applied to communication systems having any number of channels, and it can be seen that using prior art cancellation systems, the implementation complexity is overwhelming.

In a direct realization of the embodiment shown in FIG. 4, a multi-channel system would require N FFT units, i.e., one FFT unit for each of N channels. N may comprise any positive integer. In such an embodiment, the same signal would be provided to the input of each FFT. But, since the input to each FFT is the same, it follows that the output of each FFT is the same. Thus, in one embodiment of the invention, a consolidation is made such that only one FFT unit is utilized and its output is fanned out to N cancellation systems. Such an embodiment is shown in FIG. 6. With regard to the level of complexity and size reduction, in the embodiment with 4 transmitters, the total number of FFT units would be reduced from 16 to 4, a substantial 75% savings. This substantial reduction in size and complexity is in addition to the benefits gained from use of multiplication in the frequency domain instead of convolution in the time domain.

Turning now to FIG. 6, the input 302 to the first transceiver of a multi-transceiver communication system connects to the transmitter 304 and to a serial to parallel converter 604. The output of the serial to parallel converter 604 connects to an overlap processing module 608, which in turn has an output that feeds into an FFT unit 612. These devices and their operation are discussed above and hence, are not discussed again.

The output of the FFT unit 612 may be fanned using connectors 616A-616N to a cancellation system for a first channel through an $N^{th}$ channel. This reduces the total number of serial to parallel converters 604, overlap processing modules 608, and FFT units 612 by consolidating the processing apparatus and distributing the resulting signal. It provides a reduction in hardware by a factor of the number of channels. Thus, for a four channel system, one-fourth as many transform domain processing systems are required where the domain transform processing system are defined as the serial to parallel converter 604, overlap processing module 608, and FFT unit 612.

Figure 7:
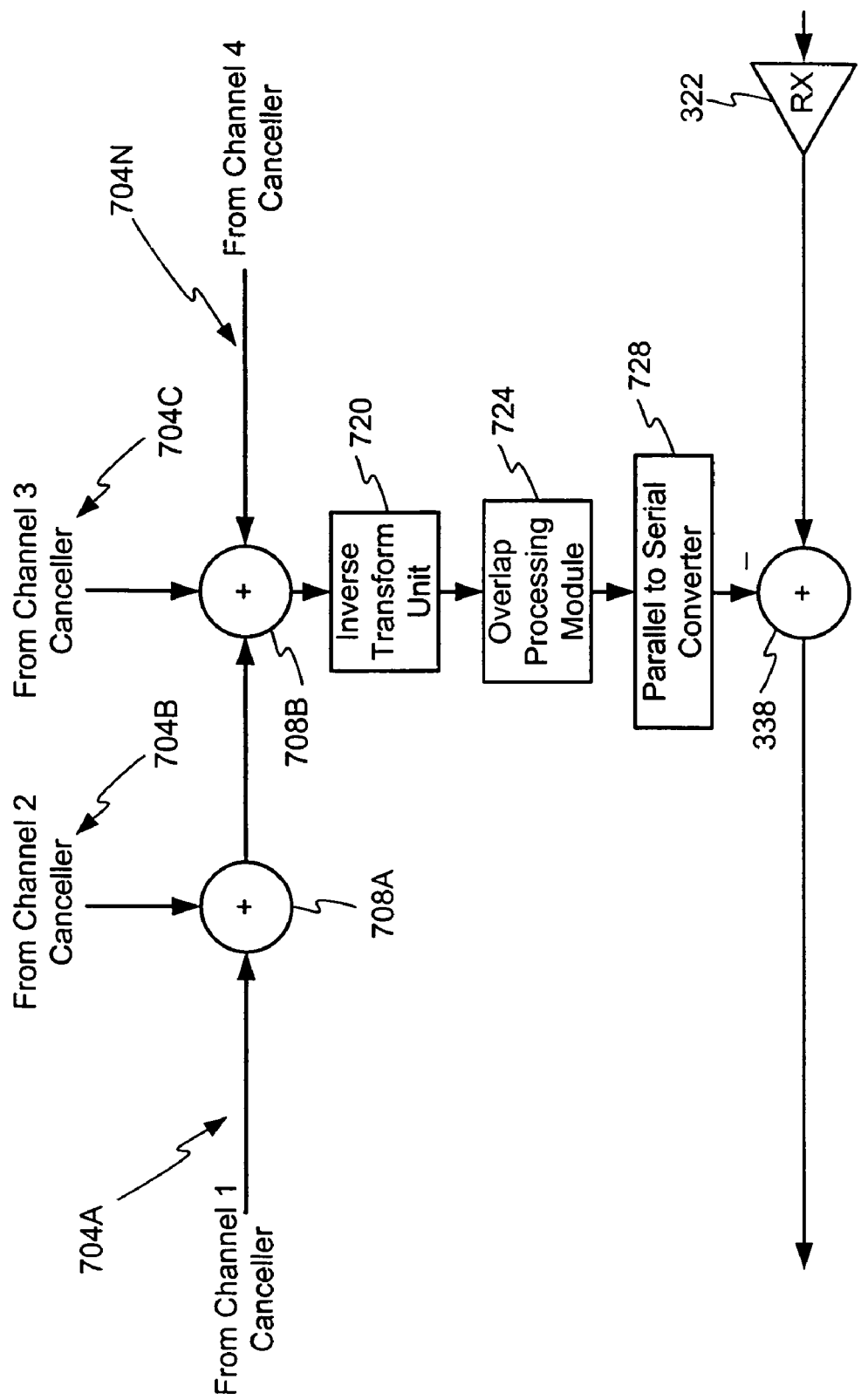
FIG. 7 illustrates a block diagram of an embodiment of a consolidated receiver side processing system in a multi-channel environment.

Similar advantages may be realized on the inverse transform side. FIG. 7 illustrates a block diagram of an embodiment of a consolidated receiver side processing system in a multi-channel environment. The embodiment of FIG. 7 is similar to FIG. 6 in that it realizes the advantages of a consolidated processing system with a distributed output. As shown, inputs 704A-704N arrive from cancellation processing systems associated with other channels. Thus, in a multi-channel environment, each receiver within each transceiver would include such hardware to cancel the unwanted echo and crosstalk.

The inputs 704A-704N connect to one or more adders, such adders 708A, 708B. An alternative embodiment may be configured to use three 2 input adders as opposed to one 2 input adder 708A and one three input adder 708B. The adders 708A, 708B combine the signals and provide the summation to an inverse transform unit 720. The output of the inverse transform unit 720 feeds into an overlap processing module 724, which in turn outputs the signal to a parallel to serial converter 728. The serial signal is provided to a subtractor 338 to be subtracted from the composite signal processed by the receiver 322.

As a result of the adders 708A, 708B, the processing of devices 720, 724, 728 may be consolidated through a single path as shown. A direct implementation without the consolidation would require an inverse transform unit 720 and its associated hardware for each channel. Due to linearity in the transform domain, the multiplicity of subtractors 338 can be moved to the input of the inverse transform unit 720 as shown. Thus, only one inverse transform unit 720 is needed. In the embodiment with 4 inputs from 4 receivers, the total number of inverse transform units 720 has been reduced by a factor of 4 (from 16 to 4), again a 75% savings.

Figure 8:
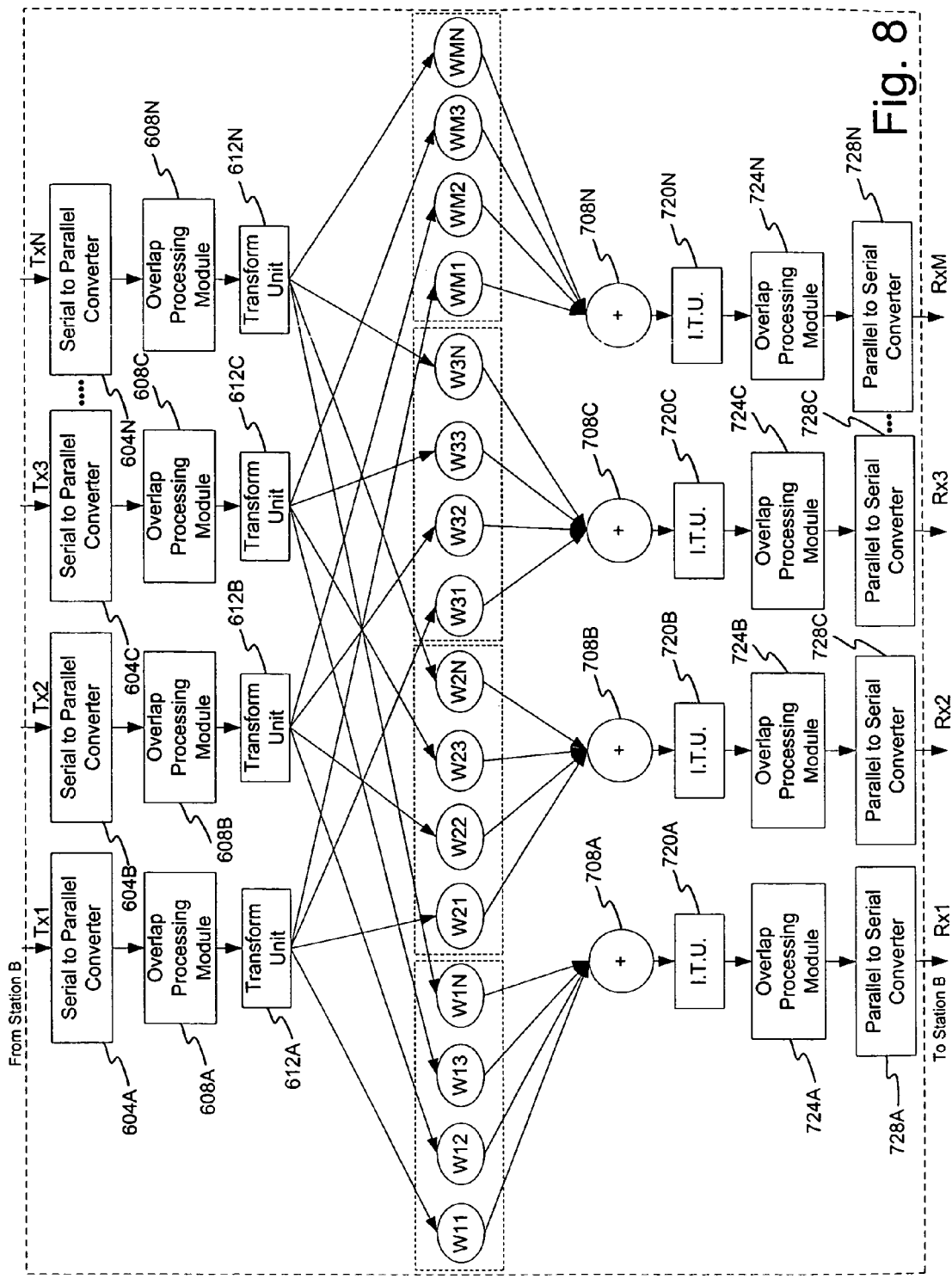
FIG. 8 illustrates a block diagram of an example embodiment of a consolidated cancellation system.

Combining the embodiments of FIG. 6 and FIG. 7 yields the embodiment of FIG. 8. FIG. 8 illustrates a block diagram of an example embodiment of a consolidated cancellation system. It is shown as having transmitters Tx1-TxN and having receivers Rx1-RxM. It is contemplated that the values of N and M may comprise any positive integer, and hence the principles may be extended to any number of transmitters and receivers. In this example, N×M frequency weights are used to complete the processing.

Turning now to FIG. 8, elements shown in FIG. 8 that are also shown in FIGS. 6 and 7, are labeled with identical reference numerals. Similarly, reference numerals that differ only by an alpha identifier are used to differentiate similar, but repetitive devices. Moreover, only the portions or aspects of FIG. 8 that were not discussed in prior figures are discussed. As shown, the output of each transform unit 612 connects as an input to one or more multipliers W. In the embodiment of FIG. 8, the output of transform unit 612A is distributed to multiple multipliers, namely multipliers W11, W21, W31, WM1. The output of the transform units 612A may be considered to be fanned out to multiplier blocks. Each multiplier block is comprised of multipliers W. In this embodiment, each multiplier block is comprised of one or more multipliers W and each block is associated with a channel.

The multiplier modules W perform multiplication of the outputs from the transform units 612 with one or more weighting variables that are provided to the multipliers W. The weighting variable input to the multiplier W is not shown in FIG. 8 due to limitations in space; however, it should be understood as being received from and an adaptation block (element 420, FIG. 4), switch or other device. The reference numeral of each multiplier W indicates the connection of the multiplier. For example, multiplier W13 is a multiplier that receives an input signal from a third transmitter and provides the multiplier output to the consolidated processing system associated with a first receiver.

The output of the multipliers W connect to summing junctions 708A-708N as shown. As can be seen in this embodiment, each summing junction 708 receives an input from a number of multipliers W. The number of inputs received at each summing junction may be based on the number of channels. Thus, summing junction 708A receives an input from multipliers W11, W12, W13, W1N. Hence, the inputs to the summing junction 708A, which corresponds to the first channel, are the coupling from each of the other channels, including the first channel. The summing junction 708A and the other elements 720A, 724A, 728A of this processing branch provide the combined and filtered signal to a subtractor (element 338, FIG. 4) to remove these coupled signals from the signal received on the first channel (element 310 of FIG. 4).

As can be seen, the output of the converter 728A is a cancellation signal that accounts for the coupling into the signal received on the first channel. This is true because the summing junction 708A receives processed cancellation signals from multipliers W11, W12, W13, W1N, which in turn had received and processed signals from each of the transmitters associated with the other channels in the communication system.

This pattern of processing also executes on the other branches of the multi-channel coupling cancellation system, as would be understood by one of ordinary skill in the art based on the previous discussion. As an advantage to this processing system as compared to the prior art or non-consolidated system, a reduction in complexity and processing is realized. For example, in a four-channel system, the reductions realized by the consolidated system shown in FIG. 8 equates to a reduction of 75% as compared to a non-consolidated system. This is in addition to the benefits gained by processing in the transform domain.

Figure 9:
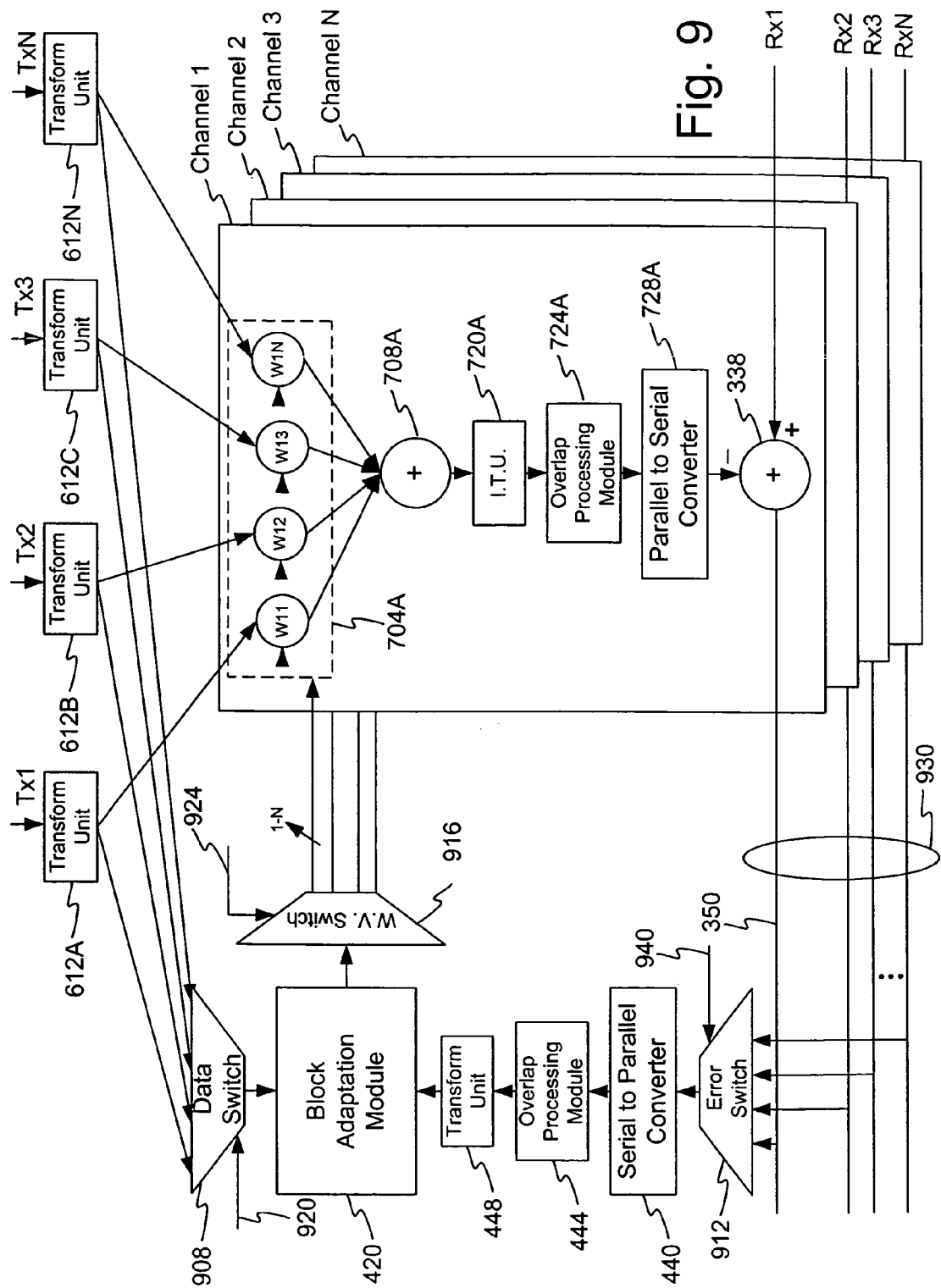
FIG. 9 illustrates a block diagram of an exemplary embodiment having distributed adaptive processing.

FIG. 9 illustrates a block diagram of an exemplary embodiment having distributed adaptive processing. In FIG. 9, elements that were described in the previous figures are referenced with identical reference numbers and are not discussed in detail again. As a result, the focus of FIG. 9 is the scheduled distribution of one or more weighting variables from the adaptation processing branch to the multipliers associated with the one or more channels. The weighting variables may be distributed to the various channels in any manner. In one embodiment, the scheduling occurs evenly in round robin fashion. In another embodiment, the round robin scheduling occurs in blocks. It is contemplated that the adaptation processing could also occur in real time for each channel, rather than shared as is shown.

In reference to FIG. 9, the transform units 612A-612N process the inputs from other channels into a transform domain, such as for example by use of a Fourier transform. The output of each transform unit 612A-612N is provided to the multiplier block 704 and to a data switch 908. It is contemplated that a multiplier block 704 be associated with each channel, in this embodiment channels 1-N. The data switch 908 selectively inputs the transform unit's outputs to the block adaptation module 420. A data switch control line 920 connects to the data switch 908 to thereby control operation of the data switch. The control signals to the switches may be generated by hardware, software, or a combination of both. In one embodiment, one or more hardware state machines generate one or more control signals used to control the switches described herein. It is contemplated that a micro controller may generate the control signals. Synchronization of data, such as by use of control signals to a switch 908, is understood by one of ordinary skill in the art and hence is not discussed in great detail herein.

The multiplier block 704 includes the multipliers W11, W12, W13, W1N. The output of the multipliers 704 feed into the processing elements subsequent to the multipliers 704 as shown for channel 1 and are processed in a manner described above in conjunction with FIG. 8. In a four channel embodiment, the adaptation module 420 may generate sixteen weighting variable sets such that each channel is provided a sub-set of four weighting variables, and each subset comprises sufficient weighting variables to modify the output from a transform unit 612 as desired.

The output of the subtractor 338 is provided as an input to an error switch 912. As part of the output of the subtractor 338 is also the FE signal or a signal generally similar to the FE signal. The error switch 912 provides one of the error input signals from lines 930 to the serial to parallel converter 440. In this embodiment, the feedback signal is considered an error signal and is used for purposes of adaptation. A control line 940 connects to the error switch 912 to control which input signal from lines 930 is provided to the serial to parallel converter 440. Processing occurs through elements 444, 448, and 420 as described above.

The block adaptation unit 420 generates the weighting variables that are provided to the weighting variable switch 916, which is in turn controlled by a control signal on a control input 924. The weighting variable switch 916 has outputs that connect to processing apparatus for each channel. As shown for channel 1, the switch 916 provides the weighting variables to the multipliers in the multiplier block 704 which would receive the weighting variables. It is contemplated that each line between the weighting switch 916 and the multiplier block 704 comprises numerous parallel lines. Thus, for the first channel, weighting variables are provided to multiplier W11, W12, W13 and so on up to multiplier W1N, wherein N is any positive integer. These are the weighting variables that the multipliers W receive and process to generate the cancellation signals to remove coupling on channel 1. As discussed above, these multipliers utilize the weighting variables during the processing to modify the outgoing signals that have been converted to the transform domain to thereby arrive at the proper cancellation signal.

Although the connection between the weighting switch 916 and each of the multiplier blocks 704A is shown as a single line, it should be understood that each connection may comprise a multi-conductor parallel line. In the specific example of the connection between switch 916 and the multiplier block 704A, there comprises a multi-path connection for each multiplier W. Likewise, numerous connecting lines between elements shown in FIG. 9 and other figures discussed herein may comprise one or more multi-path parallel conductors. For example, the input to the parallel to serial converter 728A is a parallel data path while the output of the parallel to serial converter is a serial data path.

It should be understood that for purposes of understanding, only the connections associated with channel 1 are shown. It is contemplated that connections from each transform unit 612 would have outputs which fan out to each of the other multiplier blocks 704 associated with the other channels. Likewise, an output from each of the transform units 612 would also fan out to the data switch 908 as shown for use by the block adaptation module 420.

In operation, generation of weighting variables by the block adaptation module 420 is shared by multiple channels. This has the effect of reducing complexity, power consumption, and size requirements of an implementation. To achieve these benefits, the output of the transform units 612 is selectively switched to the block adaptation module 420, as is the output of the subtractor 338 via error signal switch 912. The block adaptation module 420 performs processing on the transform unit outputs and the error signal to generate the weighting variables. The weighting variable switch 916 selectively switches the weighting variables to the multipliers W associated with the appropriate channel at the appropriate time in response to the control signal on control lines 920, 924 and 940.

It is anticipated that the rate of change in channel conditions is sufficiently slow to allow for a shared adaptation processing. Thus, during a first time period, weighting variables for a first channel are calculated and provided to the multipliers. These weighting variables are utilized by the first channel multipliers until a subsequent update for the weighting variables associated with the first channel. During a second time period, weighting variables are calculated for use by the multipliers associated with the second channel and these weighting variables are used until the next update of the second channels weighting variables. This process continues in this manner for each of the channels.

It is contemplated that the update process may occur on a sequential basis or based on some other factor. For example, a random pattern may be adopted. In another embodiment, the error signal may be monitored and adaptation processing may be dedicated on a greater percentage basis to channels having a greater error signal or with high rates of change in the error signal. In this manner, a controller, processor, or other device may selectively allocate adaptation resources based on one or more factors. For example, if one channel is subject to coupling levels that change over time, then the weighting variables associated with that channel may be updated more often than the weighting variables associated with the other channels. Prior weighting values and history may be stored in a memory or register. A comparator, control logic, or processor may perform the comparison. It is further contemplated that if the number of channels is greater than that which may be serviced in a timely manner by a single adaptation system, then the cancellation system may comprise more than one shared adaptation system. For example, an eight channel communication system may utilize a first adaptation system for the first four channels and a second adaptation system for channels five through eight.

One advantage of the shared adaptation system is that the components and processing requirements of the adaptation system need not be duplicated for each channel, and as a result, reduced power consumption and complexity is realized. In addition, cancellation system size is also minimized without degrading operation.

FIG. 10A illustrates a block diagram of an example embodiment having an error signal source selector. The embodiment shown in FIG. 9 utilized the output of the subtractor (element 338 of FIG. 9) as the error signal for adaptation. After an initial adaptation period, the adaptation may continue to account for changes in the coupling that may occur during data mode. However, when adapting based on the subtractor output, it may be necessary to maintain a narrow adaptation bandwidth that in turn may undesirably limit the effectiveness of the adaptation process. The embodiment of FIG. 10A is provided to address these issues.

In the embodiment shown in FIG. 10A, the source of the error signal is selectable as either the output of subtractor 1024, which may be compared to the output of subtractor 338 of FIG. 9, or a slicer (decision device) error signal. As shown, the aspects of FIG. 10A may be divided for purposes of discussion into an adaptive canceller subsystem 1004 and an equalization and signal isolation subsystem 1008 for channel 1. Although only the first channel processing components are shown in subsystem 1008, it is contemplated that the other channels, such as channels associated with inputs RX1, RX2, up to and including RXN, where N is any positive integer, may be configured similarly to that shown for channel 1.

The adaptive canceller 1004 may comprise any adaptive canceller capable of reducing or eliminating unwanted coupling, such as echo or crosstalk. In one embodiment, the adaptive canceller 1004 comprises the canceller shown in FIGS. 8 and 9, and hence the canceller subsystem 1004 is not described in detail again. The error value input 1012 into the adaptive canceller subsystem 1004 and the cancellation signal from the adaptive canceller subsystem on cancellation signal output 1016 provide the input to and the output from the adaptive canceller in relation to the first channel receiver 1008. The input line 1012 provides an error signal to the cancellation subsystem 1004. The output line 1016 provides the cancellation signal to the channel one receiver and the cancellation signal is subtracted from the received signal to reduce or eliminate unwanted echo, crosstalk or combination of both. The input 1012 may be compared to the input(s) lines 930 to the error switch 912 shown in FIG. 9. Similarly, the output 1016 may be compared to the input to the subtractor 338 from the parallel to serial converter 728A also shown in FIG. 9.

The first channel receiver subsystem 1008 is now discussed. A signal is received over transmission line 1020 and provided to a subtractor 1024. During operation, the subtractor 1024 removes the cancellation signal received from the adaptive canceller 1004 from the received signal. Other processing apparatus, not shown, may reside prior to the subtractor 1024 for processing of the received signal, as would be understood by one of ordinary skill in the art. The subtractor's output is provided to an error source switch 1028 and a first equalizer 1032. In one embodiment, the first equalizer 1032 comprises a feedforward equalizer; however, it is contemplated that any type equalization system may be utilized. The error source switch 1028 may comprise a multiplexer or any other type device capable of selectively providing any of two or more inputs as an output. The first equalizer 1032 may be configured to reduce intersymbol interference of the received signal.

The output of the first equalizer 1032 feeds into a subtractor 1036, the output of which feeds into a decision device 1044 and an error signal subtractor 1040. The decision device 1044 may comprise a data slicer. The subtractor 1036 subtracts a second equalizer feedback signal from the first equalizer 1032 output in a feedback configuration as shown. The output of the decision device 1044 feeds into the error signal subtractor 1040 and a second equalizer 1048. The second equalizer 1048 may be configured to reduce intersymbol interference. Both the first equalizer 1032 and the second equalizer 1048 may be trained as a pair to reduce intersymbol interference. Operation of the equalizers 1032, 1048 and the decision device are understood by one of ordinary skill in the art and accordingly, are not described in detail herein.

The output of the error signal subtractor 1040 comprises the difference between the decision device 1044 input and the decision device output. This decision device error signal defines the relative error between the received signal and the decision output by the decision device 1044. The error signal subtractor 1040 is provided as a second input to the error source switch 1028. The error source switch 1028 receives a control signal on a control line 1048 and selectively provides either of the error signals to the adaptive canceller 1004. The select signal on control input 1048 determines which error signal is provided to the adaptive canceller subsystem 1004. This apparatus may be repeated on each of the other channels or a multiplexed or switched arrangement may be utilized.

It is contemplated that either of the error signals may be utilized by the adaptive canceller 1004. In one embodiment, the error signal provided prior to equalization is utilized during an initial training mode, such as based on subtractor 1024 output. In one embodiment, this occurs in the absence of a far-end signal such as at initial start-up.

In one embodiment, the decision device error signal from the subtractor 1040 is utilized for adaptation in the presence of a far-end signal, such as for example during data mode. This allows the cancellation system to account for dynamic changes in the interference coupling behavior. The term training mode is defined to mean the processes of generating weighting variables in the adaptive canceller at start-up, restart, during transmission of a training signal, or when the amount of change in the weighting variables is too great for modification during adaptation. The term adaptation is defined to mean the processes of generating weighting variables during operation of the communication system.

As an advantage to the configuration of FIG. 10A, the error signal to the adaptive canceller may be provided from the subtractor 1024 to thereby reduce the complexity of the first equalizer 1032 and the second equalizer 1048. This method of operation improves training or adaptation accuracy of the first equalizer due to cancellation of unwanted echo and crosstalk prior to processing of the received signal by the equalizers 1032, 1048.

When a FE signal is present, an advantage of adapting based on the decision device output (output of subtractor 1040) is that for a given adaptation bandwidth the adaptation will respond faster, i.e., adapt more rapidly. Thus, the communication system may maintain a wider adaptation bandwidth as compared to adaptation based on subtractor 1024 output. The term adaptation bandwidth is related to the time constant of the adaptation system of an adaptable communication system. In other embodiments, the decision device error may be utilized during both initial training and adaptation during data mode. Although one example method of operation is described above, it is contemplated that either of the error signals may be used at any time as may be desired to suit the needs of the communication system.

Figure 10B:
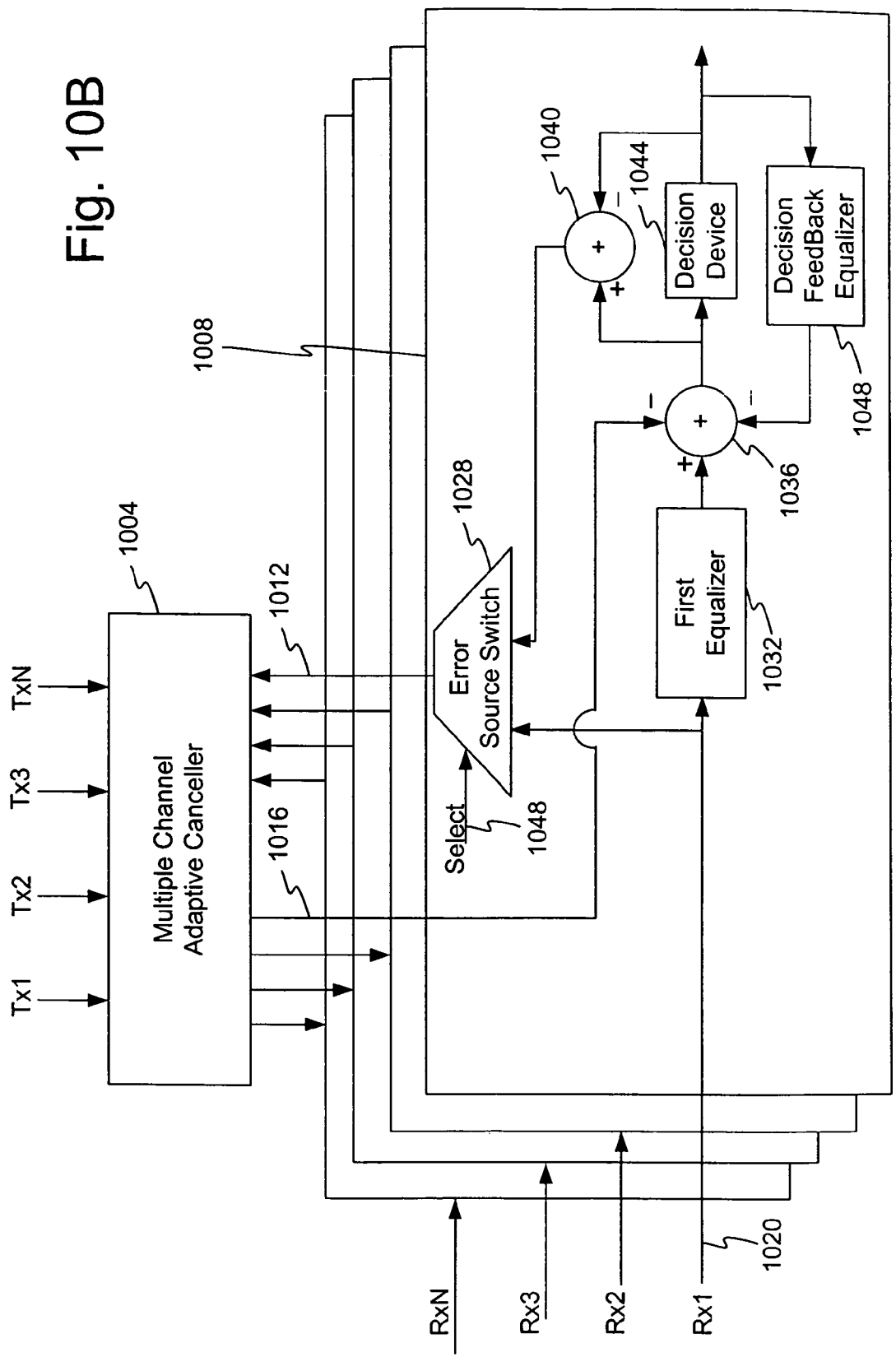

FIG. 10B illustrates an alternative embodiment of a block diagram of an example embodiment having an error signal source selector. As compared to FIG. 10A, common elements are labeled with identical reference numbers. In contrast to FIG. 10A, the embodiment of FIG. 10B routes the cancellation signal on line 1016 into subtractor 1036. In one configuration, this routing and point of subtraction occurs when the decision device error signal, which is output from subtractor 1040, is selected by the switch 1028 as the input to the multiple channel adaptive canceller 1004. This provides the advantage of a potentially more accurate operation, as the cancellation signal is subtracted from the incoming signal at a point in close proximity to the generation of the error signal.

Figure 11:
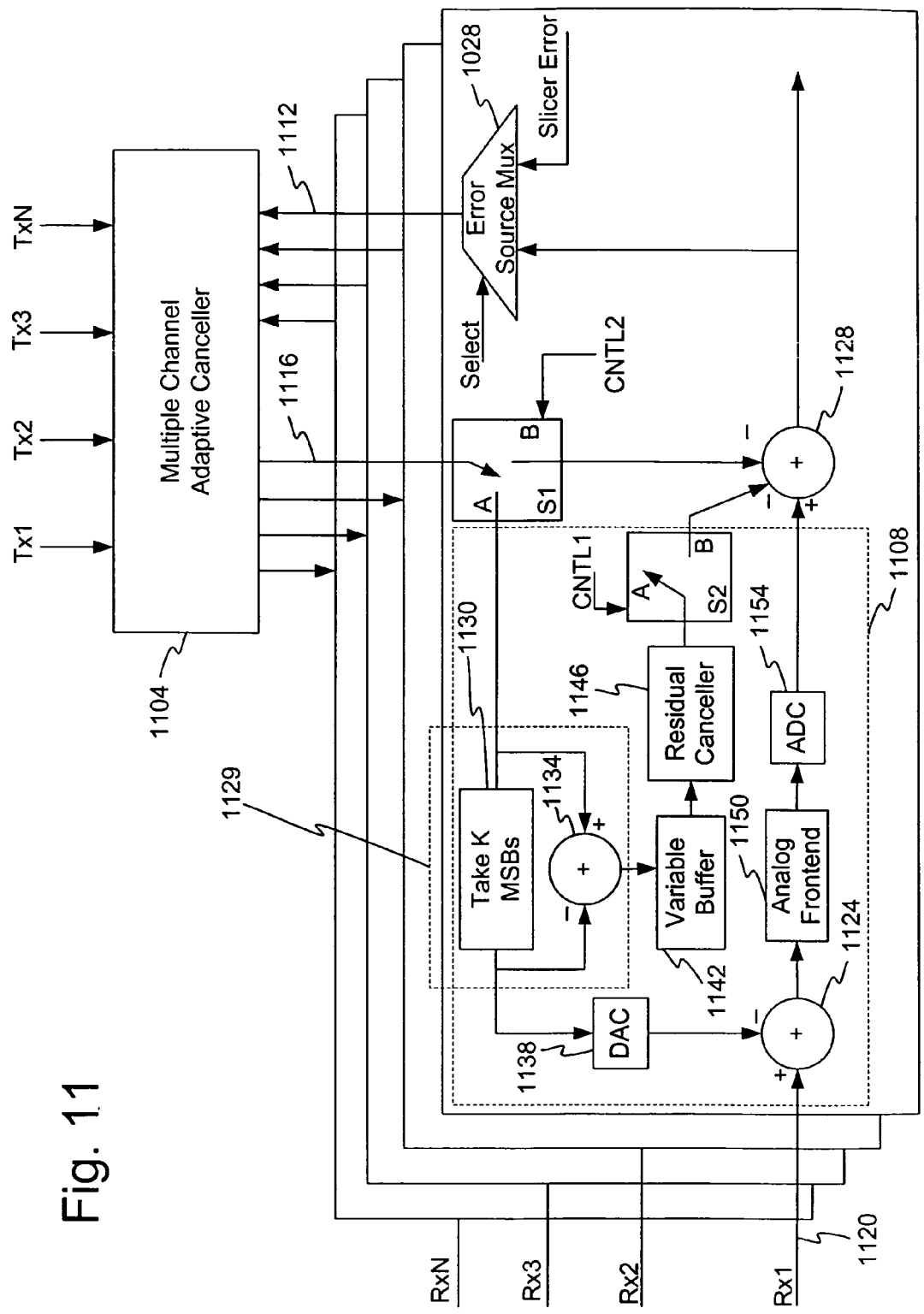
FIG. 11 illustrates a block diagram of an example embodiment of an adaptive canceller having both analog domain cancellation and digital domain cancellation capability.

FIG. 11 illustrates a block diagram of an example embodiment of an adaptive canceller having both analog domain cancellation and digital domain cancellation capability. As shown, the aspects of FIG. 11 may be divided for purposes of discussion into an adaptive canceller subsystem 1104 and an analog cancellation subsystem 1108 for channel 1. Although referred to as an analog cancellation subsystem, some aspects may have discrete implementations, as is contemplated with the residual canceller 1146. Further, although only the first channel analog cancellation components are shown in subsystem 1108, it is contemplated that the other channels, such as channels RX1, RX2, up to and including RXN, where N is any positive integer, may be configured similarly to that shown for channel 1.

The adaptive canceller 1104 may comprise any adaptive canceller capable of reducing or eliminating unwanted coupling, such as echo or crosstalk. In one embodiment, the adaptive canceller comprises the canceller shown in FIGS. 8 and 9, and hence the canceller subsystem 1104 is not described in detail again. The error value input 1112 into the adaptive canceller subsystem 1104 and the cancellation signal from the adaptive canceller subsystem 1104 on cancellation signal output 1116 provide the input to and the output from the adaptive canceller in relation to the first channel receiver. The input 1112 provides an error signal to the cancellation subsystem 1104. The output 1116 provides the cancellation signal to the first channel receiver and the cancellation signal is subtracted from the received signal to reduce or eliminate unwanted echo or crosstalk. The input 1112 may be compared to the input(s) lines 930 to the error switch 912 as shown in FIG. 9. Similarly, the output 1116 may be compared to the input to the subtractor 338 from the parallel to serial converter 728A, both of which are shown in FIG. 9.

In some instances, the dynamic range of the signal may be very large, and as a result, it may be desired to cancel a portion or all of the coupling in the analog domain. This will prevent clipping, which is generally understood to be undesirable. This may be due to limitations in the analog-to-digital converter utilized to convert the received analog signal to the digital domain. One such limitation may comprise a limited dynamic range, which may be exceeded when unwanted echo or crosstalk is combined with the FE signal. These challenges are made more difficult at high speed and high resolution processing. Canceling a portion of the coupling, i.e., the echo and the crosstalk, in the analog domain reduces the dynamic range requirements of analog front-end processing systems and the analog to digital converter associated with the receiver. Hence, in one embodiment it is desired to cancel all or a portion of the echo or crosstalk or both in the analog domain.

Turning now to the analog cancellation subsystem 1108, the received signal is provided on an input 1120 to an analog subtractor 1124. Also provided as an input to the analog cancellation subsystem 1108 is the cancellation signal from the adaptive cancellation subsystem 1104 on path 1116. The path 1116 connects to a switch S1 having a first position A and a second position B. The switch S1, when in a second position B, provides the signal to a subtractor 1128 to achieve operation as described above in conjunction with FIG. 10. Alternatively, switch S1 may be in the first position A, thereby connecting the cancellation signal, which is in the digital domain, to a MSB (most significant bit) isolation unit 1130 and to a subtractor 1134. In combination, the MSB isolation unit 1130 and a subtractor 1134 may be considered a MSB and LSB (least significant bit) isolation system. When mixed signal canceling, it may be desired to cancel the more significant portion of the coupling in the analog domain. Hence, the most significant bits are isolated for analog cancellation. The MSB isolation unit 1130 isolates any number of most significant bits, which are in turn provided to a digital-to-analog (DAC) converter 1138 and to the subtractor 1134. It is contemplated that all of the bits may be isolated. The MSB isolation unit 1130 may comprises any device configured to isolate and output the most significant bits and the least significant bits. The MSB isolation unit may comprise a multiplexer, shift registers, control logic, or combination thereof.

The subtractor 1134 generates a difference signal between the input to the MSB isolation unit 1130 and the output of the MSB isolation unit and provides this difference signal to a variable buffer 1142. In the embodiment shown in FIG. 11, the difference signal comprises one or more least significant bits of the cancellation signal from the adaptive canceller 1104.

The variable buffer 1142 comprises any type memory, register or other data storage device configured to store data. In one embodiment, the variable buffer 1142 performs short term buffering to aid in synchronization of a received signal with the cancellation signal. Thus, the error portion can then be properly aligned with the LMS algorithm or other adaptation method so that adaptation occurs properly. It is further contemplated that the coupling signals may propagate through a transmission line at a different rate than the primary signal. As a result, buffering or delay may be necessary or desired.

The output of the variable buffer 1142 feeds into a residual canceller 1146. The residual canceller 1142 may comprise a digital filter or signal processing device configured to process an input to yield an output dependant upon one or more filter coefficients. In one embodiment, the residual canceller 1142 operates in the time domain and is trained, adapted, or both, based on the LMS algorithm. In one exemplary embodiment, the residual canceller comprises an adaptive eight tap digital filter configured to account for the impulse response of the analog front-end. The impulse response may cause a delay in the signal. The residual canceller 1146 accounts for delay and changes in signal characteristics, such as from filtering, that occurs in the analog front-end. In one embodiment, the residual canceller 1146 comprises a time domain filter. In one embodiment, the residual canceller 1146 comprises an eight tap filter, although the claims should not be limited by this example implementation. The residual canceller 1146 may be adapted using the same error signal as the adaptation system shown in FIG. 9. If analog cancellation occurs, then it may be necessary to modify the adaptation of the residual canceller 1146 to account for delay or other signal modification, time dispersion, or filtering effects of the analog front end. Accordingly, the residual canceller 1146 may be considered a dynamic device capable of accounting for the effect of the signal passing through elements 1124, 1150, and 1154.

The output of the residual canceller 1146 is an input to a second switch S2. The second switch has a first position A and a second position B as shown. The second position B of switch S2 connects the output of the residual canceller 1146 to the subtractor 1128.

The aspects of the analog cancellation subsystem 1108 that were previously described comprise aspects of cancellation that occur in the digital domain. Such digital cancellation may occur in addition to the analog domain cancellation that is described below. As identified above, the DAC 1138 converts the most significant bits from the adaptive canceller 1104 to the analog domain. Any type analog to digital converter may be utilized as would be understood by one of ordinary skill in the art. Cancellation only in the analog domain may challenge the dynamic range capability of the digital-to-analog converter 1138. The output of the DAC 1138 feeds into the analog subtractor 1124 and is subtracted from the received signal arriving on input 1120. Because the output of the DAC 1138 is the most significant portion of the cancellation signal received from the adaptive canceller 1104, this subtraction cancels at least a portion of the received signal in the analog domain. Canceling a portion of the coupling signal in the analog domain provides the advantage of reducing the dynamic range requirements of subsequent processing and reducing the amount of echo or cancellation or both that must be cancelled using digital signal cancellation. Another advantage is that canceling a portion of the coupling signal in the analog domain reduces the amount of resolution required in the digital-to-analog conversion process compared to cancelling all the coupling signal in the analog domain.

The output of the subtractor 1124 connects to an analog front-end 1150 that is configured to perform analog processing on the analog signal. In one embodiment, the analog front-end 1150 comprises analog filtering, amplification and other analog processing. This processing prepares the signal for subsequent processing, such as conversion to the digital domain. Thereafter, an analog to digital converter (ADC) 1154 transforms the analog signal to the digital domain. The resulting digital signal feeds into the subtractor 1128, which may subtract from the ADC output the signal from the first switch S1 or the second switch S2. This configuration of hardware, software or both may be repeated for each of the other channels in a multi-channel communication system.

The first switch S1 and the second switch S2 assume either of two different positions. In one method of operation, the following table defines possible switch position permutations.

| Switch S1 Position | Switch S2 Position | System Operation |
|---|---|---|
| B | A | All Cancellation Occurs in Digital Domain |
| A | A | All Cancellation Occurs in Analog Domain |
| B | B | Not Allowed |
| A | B | Cancellation Occurs in Both Analog and Digital Domain |

Through selective control of the position of switches S1, S2, the type of cancellation that occurs may be tailored to suit the particular needs of the communication system.

It should be noted that the system shown in FIG. 11 may be modified in accordance with the teaching of FIG. 10B to accommodate situations when the error signal on line 1012 (FIG. 10B) comprises the decision device error output, such as for example a slicer error, generated by device 1040 in FIG. 10B. In such an embodiment, it is contemplated that the outputs of the switches S1 and S2 shown in FIG. 11 may be configured with outputs that connect to the subtractor 1036 (FIG. 10B) instead of connected to the subtractor 1128 of FIG. 11 or the subtractor 1024 of FIG. 10A. As discussed above, this provides the advantage of subtracting the cancellation signal from a received signal at a point in the processing chain that is close to the point where the error signal is generated. Such considerations may improve system performance and accuracy.

Figure 12:
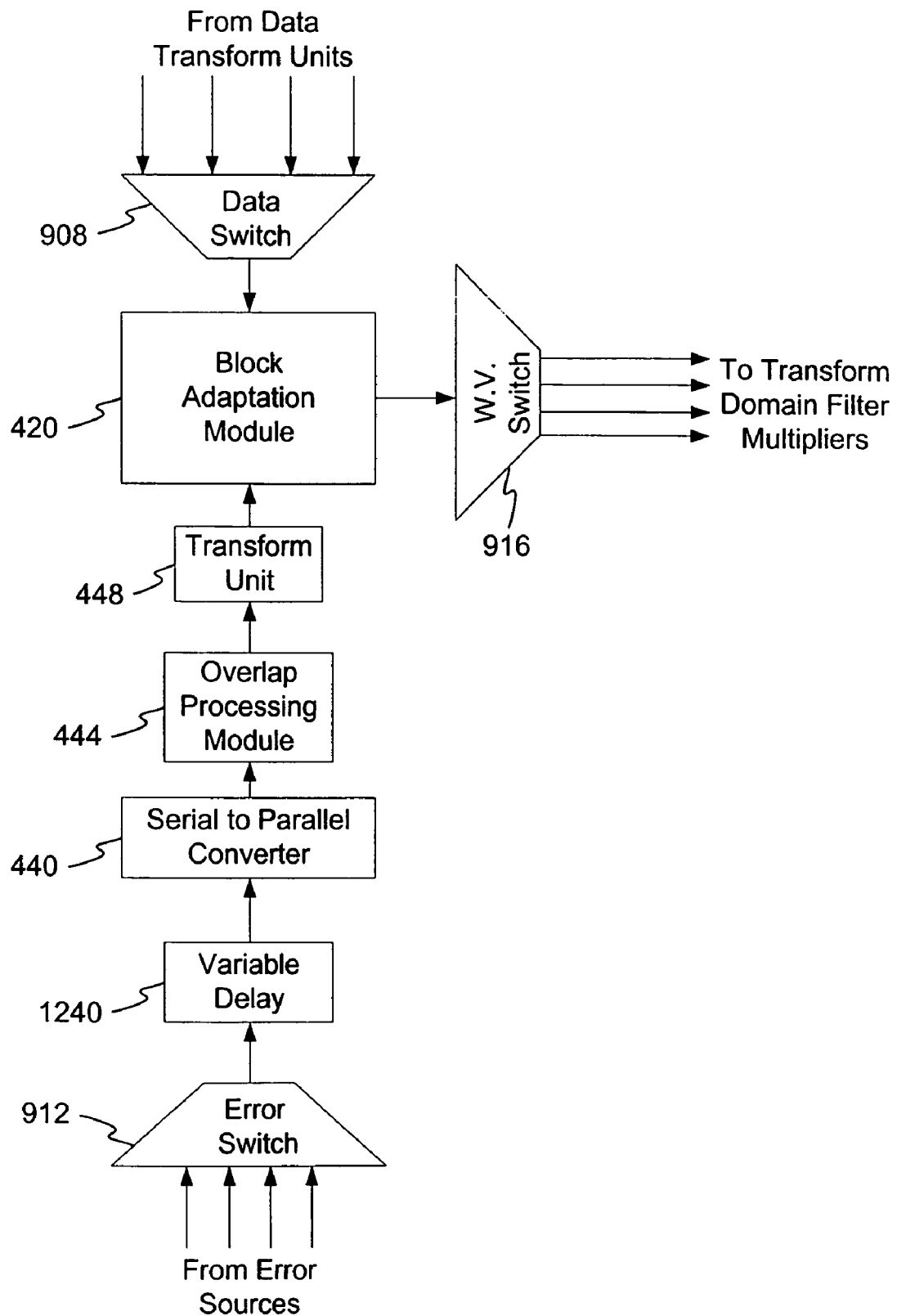
FIG. 12 illustrates a block diagram of an example embodiment of an adaptation processing system having a variable delay.

FIG. 12 illustrates a block diagram of an example embodiment of an adaptation processing system having a variable delay. FIG. 12 is generally similar to aspects of FIGS. 4 and 9 and, as a result, aspects of FIG. 12 that differ from FIGS. 4 and 9 are the focus of discussion. In addition to the components of FIGS. 4 and 9, the embodiment of FIG. 12 includes a delay 1240 configured to receive the output of the error switch 912. As shown, the delay 1240 may be variable and controlled to optionally introduce any level of delay into the error signal from the error switch 912 to thereby synchronize the output of the data switch 908 with the output of the transform unit 448. The variable delay 1240 of FIG. 12 may be similar in construction and operation to the variable buffer 1142 shown in FIG. 11. Any level or amount of delay or filtering may be implemented and the amount of delay or filtering may differ or be identical to the delay introduced by the variable buffer 1142 of FIG. 11. Other aspects of the processing performed by the system of FIG. 12 occur as described above.

It is contemplated that the above-described embodiments may be implemented in the wireless environment. In such an embodiment, a wireless communication device or system may utilize more than one wireless channel to increase data transmission rates or reduce error rates. A wireless channel would replace the channels described above to create a multi-channel wireless communication system. The wireless communication system may utilize an optical signal, a radio frequency or other frequency electromagnetic type signal, or any other type of wireless channel in use now or in the future.

It is also contemplated that the processing described herein may occur in an optical communication system utilizing fiber optic cable or paths. A Fourier transform and its inverse may be performed optically, and hence the processing described above may be performed in the optical environment.

Operation

Figure 13A:
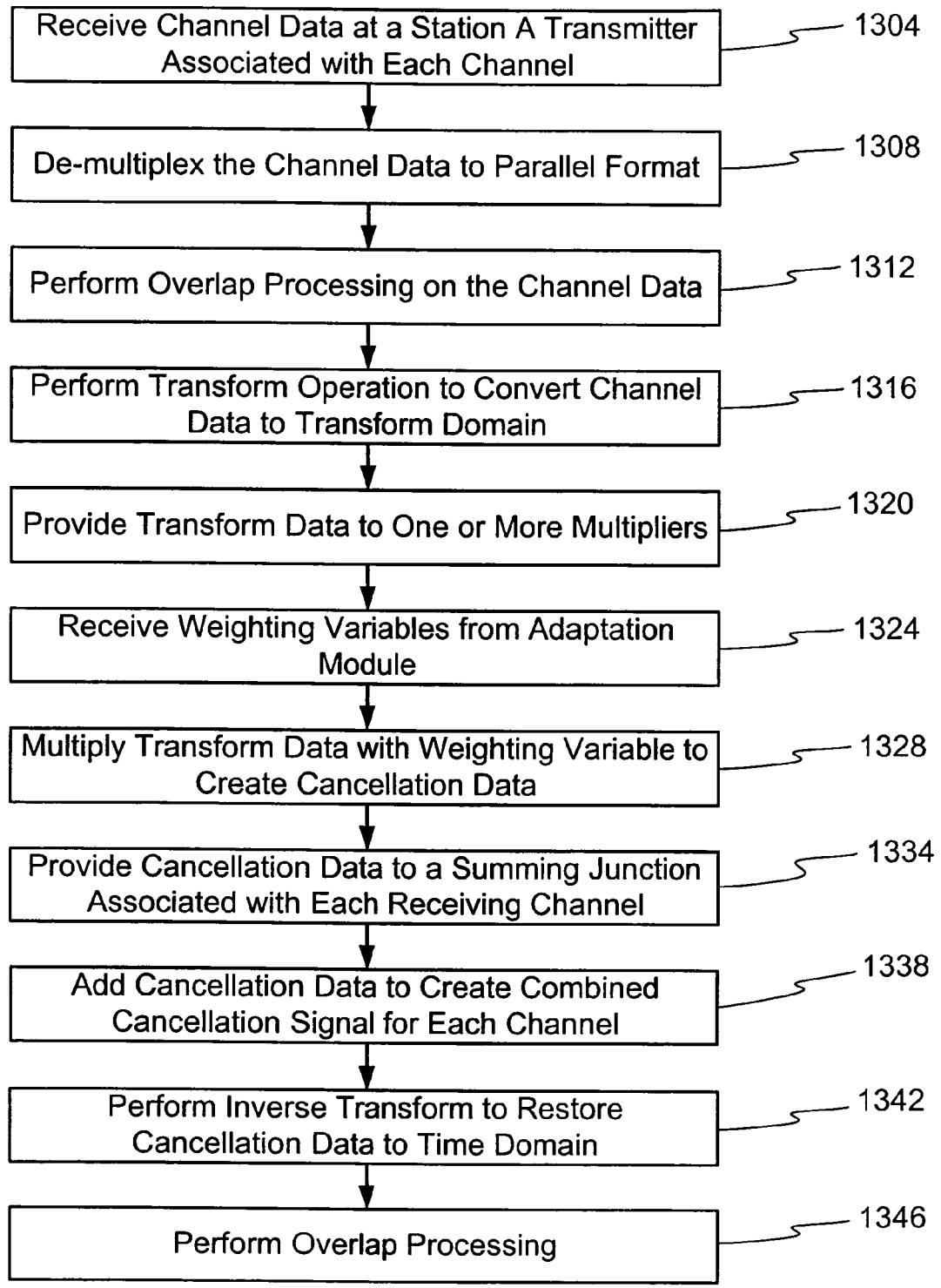
FIGS. 13A and 13B illustrate an operational block diagram of an example method of operation of one embodiment of the invention.
Figure 13B:
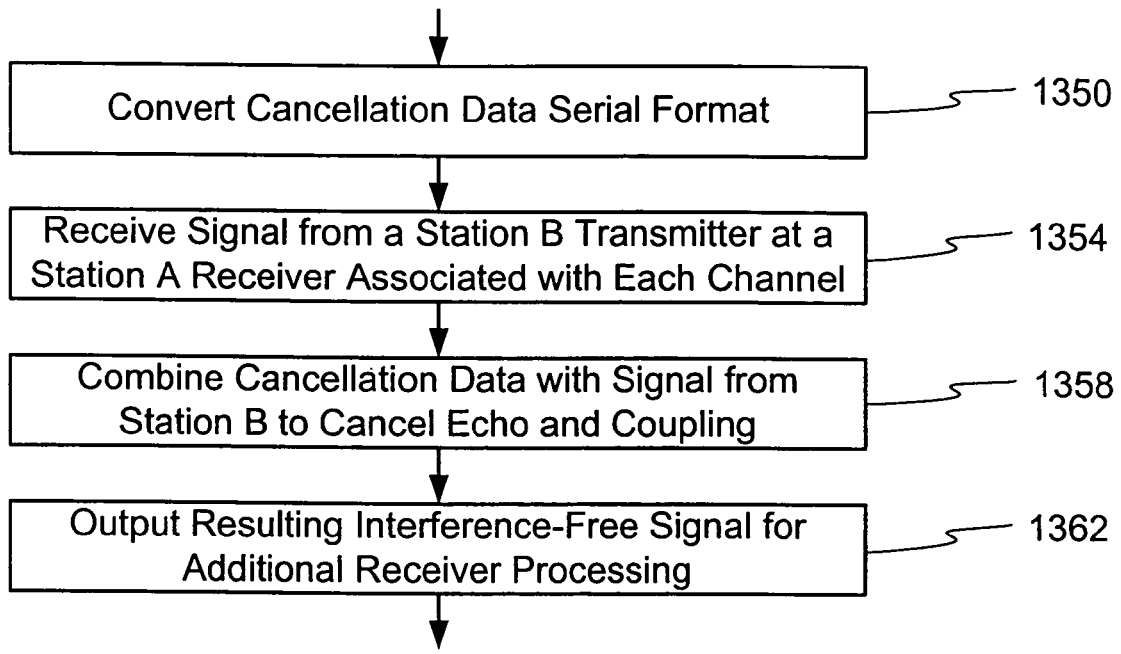

FIGS. 13A and 13B illustrate an operational block diagram of an example method of operation of one embodiment of the invention. In this example method, a reduced number of processing paths are utilized, such as is contemplated by FIG. 8, to reduce computational complexity. Moreover, a transform operation allows use of less complex processing methods. At a step 1304, the cancellation system receives channel data at a station A transmitter. It is contemplated that the cancellation system is part of a multi-channel communication system and that there may be a transmitter associated with each channel. The data may be received from a data source for transmission over a channel to a receiver at a station B. As part of transmission, the channel data signal may also be provided to a cancellation system for processing to generate cancellation signals. The cancellation signals are provided to the receivers at station A to cancel interference generated by the transmission of the channel data transmitted from station A to station B and which couples into the channel data, such as a far end signal, transmitted from station B to station A. The term channel data as used in FIG. 13 means data or signals that are received over a channel or are to be transmitted over a channel.

At a step 1308, the cancellation system de-multiplexes the channel data from a serial format to a parallel format. At a step 1312, the cancellation system performs overlap processing on the channel data. Overlap processing occurs to allow time-domain linear convolution to be performed by multiplication in the transform domain. Next, at a step 1316 the cancellation system performs a transform operation to convert the data to a transform domain to create transform data. The term transform domain is defined above. Once the channel data is in the transform domain, the operation progresses to a step 1320 and the transform data is output to one or more multipliers. Likewise, at a step 1324 the multipliers receive weighting multipliers from an adaptation module. The weighting multipliers comprise numeric values that are selected to modify the transform data, based on an error signal. Accordingly, at a step 1328 the multipliers multiply the transform data with the weighting variables to generate cancellation data. In one embodiment, the multiplication occurs on a data block by data block basis. It is contemplated that in one embodiment a weighting variable is multiplied with the value on each parallel conductor. Next, at a step 1334 the cancellation system provides the cancellation data to one or more summing junctions.

In one embodiment, the multipliers are associated into blocks and each block of multipliers is associated with a processing path that feeds into a particular summing junction and thereafter used for cancellation on the incoming signal on a particular channel. In such an embodiment, the output from each transform unit feeds into at least one multiplier in each multiplier block. In this embodiment, the output of each multiplier in each multiplier block feeds into the same summing junction. A hardware representation of this embodiment is shown in FIG. 8.

Next, at a step 1338 the cancellation system adds the cancellation data that was presented to each summing junction. This process of adding combines cancellation data from each transmit channel into a cancellation signal tailored to cancel the unwanted interference that will be present on each incoming signal, such as an incoming signal from a station B. Thus, a composite cancellation signal is created in each summing junction at step 1338. Thereafter, at a step 1342 the operation performs an inverse transform to reverse the effect of the transform operation and return the cancellation data to the time domain. As an advantage of the method and apparatus described herein, the linear properties of the transform domain allow the summation of the individual cancellation signals to be added to form a composite combined cancellation signal. As a result of these properties, processing may be consolidated and complexity reductions realized.

At a step 1346, overlap processing occurs, and at a step 1350 the cancellation system converts the cancellation data to a serial format. Thereafter, concurrently, or prior thereto, a station A receiver receives an incoming signal from a station B transmitter. The incoming signal, having previously passed through one of the channels connecting station A to station B, comprises interference coupling and the far-end signal. To remove the unwanted interference coupling, the operation at a step 1358 combines the cancellation data with the incoming signal. In one embodiment, the cancellation signal is created to be generally identical to the unwanted interference that coupled onto the incoming signal, and hence the cancellation signal is subtracted from the incoming signal. Thereafter, at step 1362 the operation outputs the resulting interference free signal from the receiver or the cancellation system for additional receiver based processing.

Figure 14:
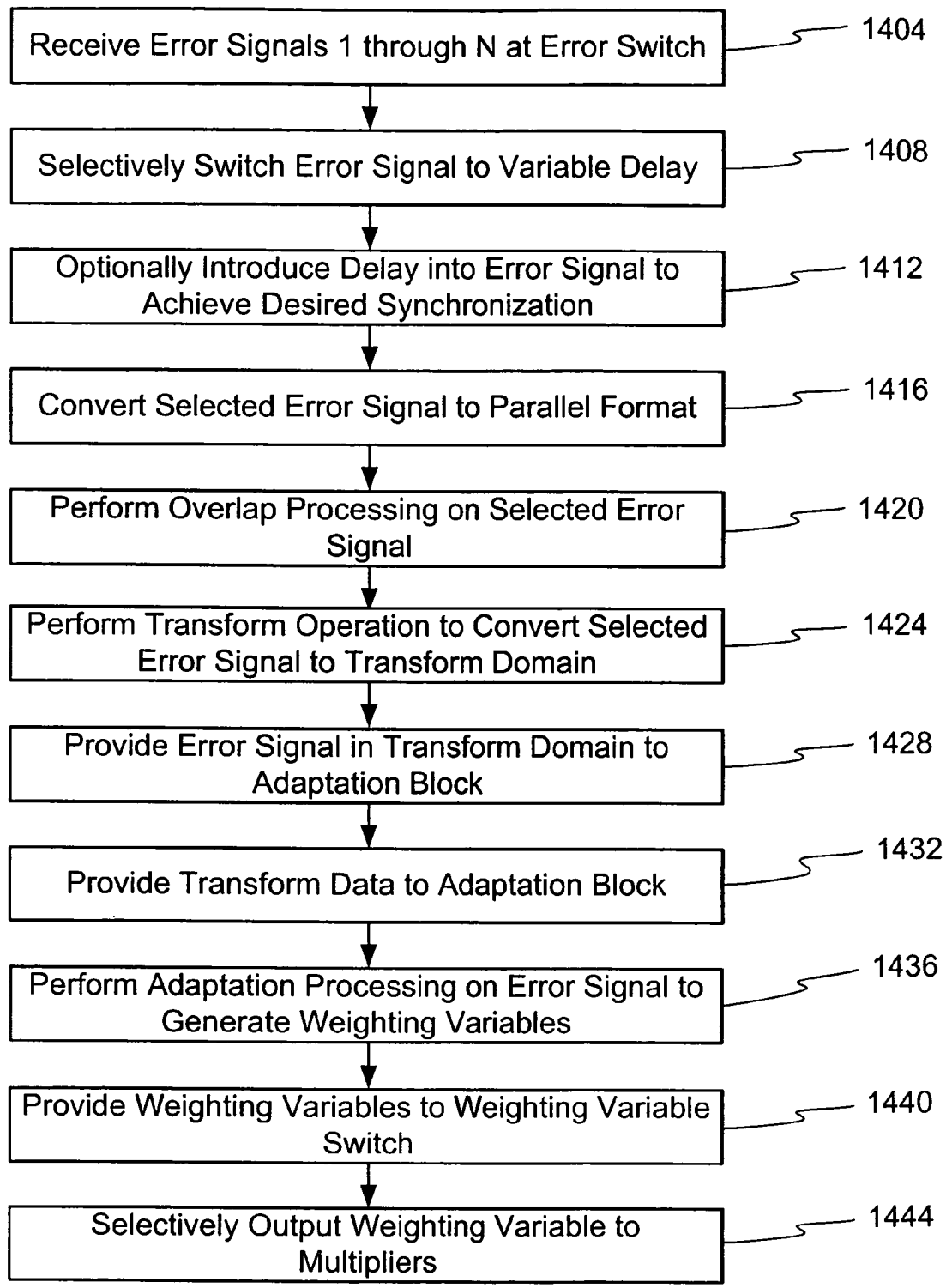
FIG. 14 illustrates an operational flow diagram of an example method of weighting variable generation and distributed processing.

FIG. 14 illustrates an operational flow diagram of an example method of weighting variable generation and distributed processing as may be performed by an adaptation system. This is but one possible method of generating weighting variables and selectively distributing the weighting variables to other aspects of the weighting system. At a step 1404, this exemplary method of operation receives error signals at an error switch. Any number of error signals may be received, such as error signals 1 through N, where N is any positive integer. In one embodiment, the error switch is provided with error signals from each channel. It is contemplated that in one embodiment an error signal comprises the incoming signal after having the cancellation signal subtracted from the incoming signal. In one embodiment, the error signal comprises a signal based on a decision device output or decision device error signal.

Next, at a step 1408 the adaptation system selectively switches one or more selected error signals to a variable delay. In one embodiment, only one error signal is provided to the delay. At the delay, and at a step 1412, the delay may optionally introduce any amount of delay into the error signal to achieve a desired level of synchronization with other aspects of the cancellation system. Any type of delay may be utilized. It is also contemplated that the delay may be introduced at any stage of processing or may be introduced within the cancellation system instead of or in addition to the adaptation system. Thereafter, at a step 1416 a serial to parallel converter converts the selected error signal to a parallel format. At a step 1420, the adaptation system performs overlap processing on the selected error signal and at a step 1424 error signal undergoes a transform operation to convert the selected error signal to the transform domain. It is contemplated that the transform units of the cancellation system and the transform units of the adaptation system manipulate an input into a domain that share the properties discussed above so that compatibility may be maintained. In other embodiments, simplified processing may occur other than a multiplication.

After the transform operation, the data is provided to an adaptation module. This occurs at a step 1428. At step 1432, the transform data, which comprises the channel data in the transform domain, is provided to the adaptation module. In one embodiment, the transform data is provided to the adaptation module via a data switch that operates in a similar manner to the error switch. It is contemplated that the switches of the adaptation system are synchronized such that during common time periods, processing occurs on data, such as error signals and channel data corresponding to a common channel. Thus, when the adaptation module is receiving an error signal associated with channel 1, it would also be receiving transform data associated with channel 1.

At a step 1436, the adaptation module processes the transformed error signal and the transform data to generate weighting variables. The processing generates weighting variables tailored to modify the transform data into cancellation data capable of canceling interference that has coupled onto the incoming signal. The adaptation module may perform any type processing to generate the weighting variables. In one embodiment, the least mean square algorithm is executed. In other embodiments, least squares type adaptation occurs.

After adaptation processing the adaptation module outputs one or more weighting variables to the weighting variable switch. This occurs at a step 1440. The weighting variable switch selectively outputs the weighting variables to the multipliers of the cancellation system. As discussed above, the adaptation system may be considered to be shared by the one or more channels of the multi-channel communication system. It is contemplated that the rate of change in the interference that couples onto a channel is sufficiently slow to allow for a shared adaptation system. At a step 1444, the weighting variable switch outputs the one or more weighting variables to the multipliers.

Figure 15A:
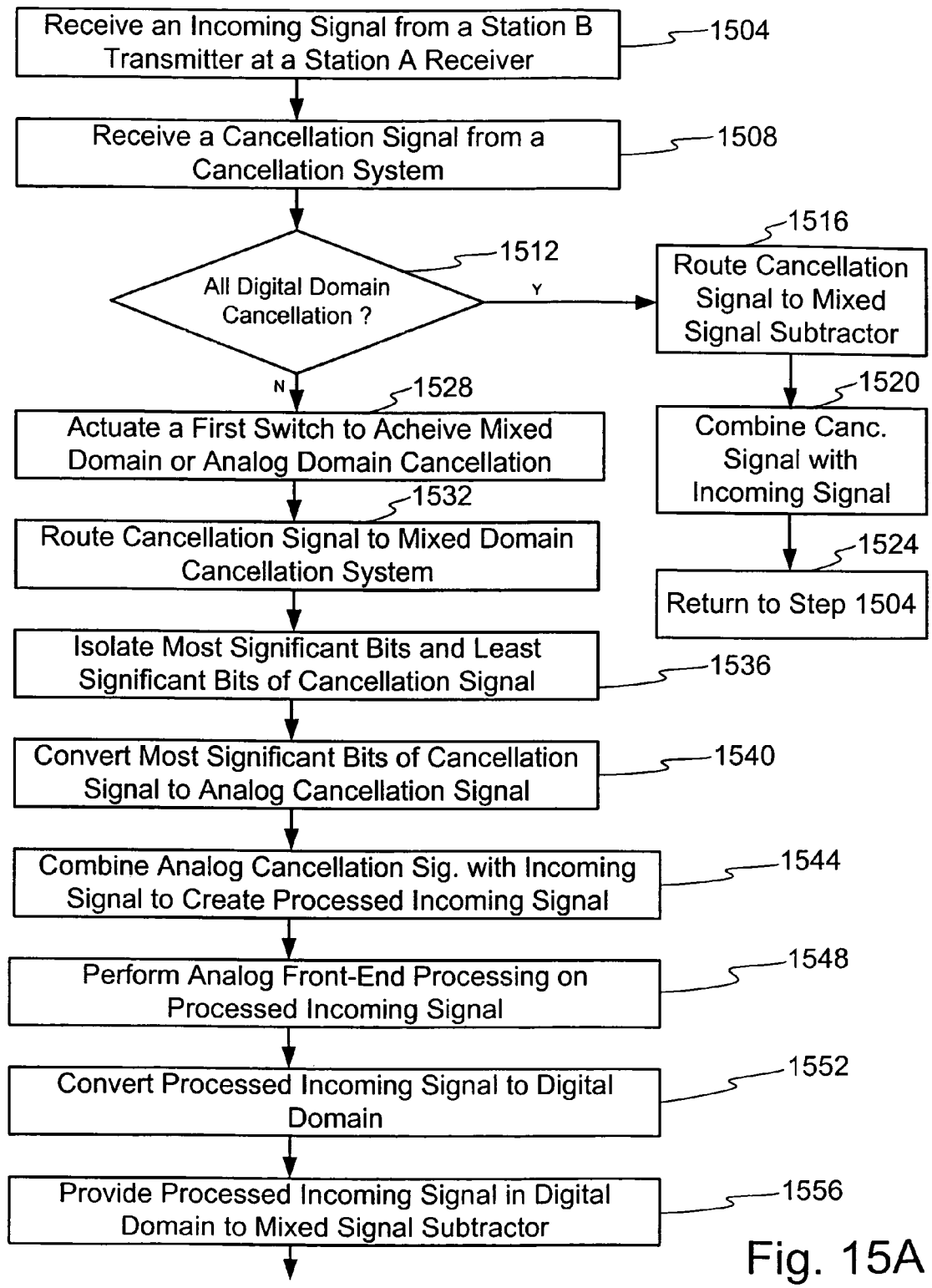
FIGS. 15A and 15B illustrate an operation flow diagram of an example method of operation of mixed signal cancellation.
Figure 15B:
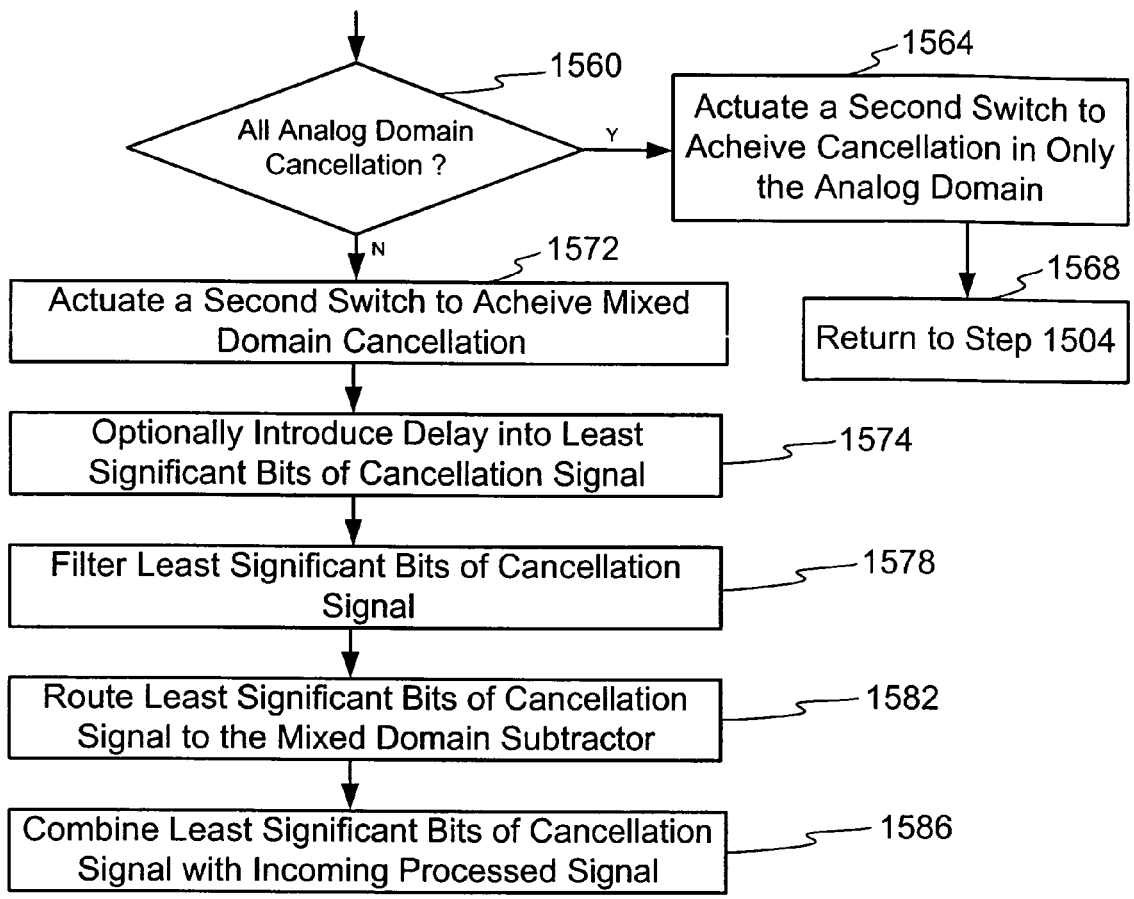

FIGS. 15A and 15B illustrate an operation flow diagram of an example method of operation of mixed signal cancellation. It may be desired to perform at least a portion of the cancellation in analog domain. As a result, in one embodiment the cancellation may selectively occur in only the digital domain, only the analog domain, or in both domains. Cancellation utilizing both analog domain cancellation signals and digital domain cancellation signals is referred to as mixed domain cancellation. While numerous methods for mixed domain cancellation may be enabled based on the principles disclosed herein, FIGS. 15A and 15B provide one exemplary method of operation. It is contemplated that the method described herein may occur at each receiver or at a centralized location that is shared by each receiver in a multi-channel communication system. At a step 1504, a receiver within a station A communication device receives an incoming signal from a station B transmitter. At a step 1508, the receiver receives a cancellation signal from a cancellation system, such as for example the cancellation system described above.

At a decision step 1512, a determination is made as to whether the cancellation will be entirely in the digital domain. If the cancellation will occur only in the digital domain, then the operation advances to step 1516 and routes the cancellation signal, which is contemplated to be in the digital domain, to a mixed signal subtractor. At a step 1520, the operation combines the cancellation signal with the incoming signal, such as a signal from the station B. By combining the cancellation signal with the incoming signal, the unwanted echo, or crosstalk, or both may be cancelled.

Alternatively, it may be preferred to perform mixed domain cancellation or only analog domain cancellation. If at step 1512, the analog or mixed domain cancellation is selected, then the operation advances to a step 1528 wherein the mixed signal processing system actuates a first switch to achieve mixed domain or analog cancellation. As a result of the actuation of the first switch, the cancellation signal is routed to a mixed domain cancellation system. This occurs at a step 1532. At a step 1536, the most significant bits are isolated from the least significant bits. This may occur in any manner as would be understood by one of ordinary skill in the art.

Thereafter, at a step 1540 the mixed signal processing system converts the most significant bits to an analog cancellation signal. This may occur in a digital-to-analog converter. At a step 1544, the analog cancellation signal is combined with the incoming analog signal to create a processed incoming signal. The processed incoming signal comprises the incoming signal with a portion of the interference generated by echo and crosstalk removed. The portion of the interference that is removed is the portion removed by the most significant bits of the cancellation signal. It is contemplated that all of the interference may have been removed at this stage, or that a portion of the unwanted interference may remain in the processed incoming signal.

At a step 1548, the processed incoming signal is subject to front-end processing, as would be understood by one of ordinary skill in the art, and at step 1552 the mixed signal processing system converts the processed incoming signal to the digital domain. Thereafter, at a step 1556 the processed incoming signal, now in the digital domain, is provided to the mixed signal subtractor. The mixed signal subtractor may combine the processed incoming signal with other signals in the mixed signal subtractor. If only analog domain cancellation is occurring, then the analog domain cancellation may be the only cancellation that occurs, and as a result, the processed incoming signal is provided to other aspects of the receiver for further processing.

It is also contemplated that in addition to the analog domain cancellation, it may be desired to also perform cancellation in the digital domain. Thus, at a decision step 1560 a determination is made if only analog domain cancellation will occur. If at decision step 1560 only analog domain cancellation is to occur, then the operation advances to a step 1564 wherein a second switch is actuated to achieve cancellation only in the analog domain. Cancellation in only the analog domain is described above. At a step 1568, the operation returns to a step 1504, and the operation repeats during signal reception.

Alternatively, if at step 1560 mixed signal cancellation is desired, then the operation advances to a step 1572. At a step 1572, the second switch is actuated to route a portion of the cancellation signal in the mixed signal processing system to be processed in accordance with the following steps.

At a step 1574, delay is optionally introduced into the least significant bits of the cancellation signal that was isolated at step 1536. Thereafter, at a step 1578 the mixed signal processing system filters the least significant bits of the cancellation signal. The filtering of step 1536 occurs to compensate for filtering by the analog front-end that occurs between the point where the analog cancellation signal is combined with the far-end signal and the mixed mode subtractor. At a step 1582, the mixed signal processing system routes the least significant bits of the cancellation signal to the mixed domain subtractor, wherein at a step 1586 the mixed domain subtractor combines the least significant bits of the cancellation signal with the incoming processed signal. By combining the least significant bits of the cancellation signal with the incoming processed signal, additional cancellation of interference occurs. The portion of the interference that is cancelled is that represented by the least significant bits of the cancellation signal. Mixed domain cancellation cancels a portion of the interference in the analog domain and hence, prior to the front-end processing. This provides the advantage of a lower dynamic range required by the analog front-end, such as the analog to digital converter, and precise cancellation that can be achieved by having at least a portion of the cancellation occurring in the digital domain. Other advantages include, but are not limited to, a reduction in the amount of resolution required in the digital-to-analog conversion process compared to canceling all the coupling in the analog domain.

While various embodiments of the invention have been described, it will be apparent to those of ordinary skill in the art that many more embodiments and implementations are possible that are within the scope of this invention.

What is claimed is:

1. A method performed at each transceiver for reducing interference in an incoming signal received at a transceiver of a communication device using four channels to communicate data between a first transceiver and a second transceiver comprising:

receiving, in a serial format, a signal to be transmitted over a channel, the transmitted signal to be transmitted from the transceiver on one of the four channels, all of which terminate at a single transceiver;

converting the signal to a parallel format;

performing overlap processing on the signal;

performing a Fourier transform on the signal to create a transform domain signal wherein only one Fourier transform per channel occurs to create the transform domain signal;

distributing the transform domain signal to two or more multipliers, at least one of which is associated with a different channel;

multiplying the transform domain signal by one or more weighting variables to create a weighted transform domain signal;

performing an inverse Fourier transform on the weighted transform domain signal to create a cancellation signal wherein only one inverse Fourier transform per channel occurs to create the cancellation signal;

performing overlap processing on the cancellation signal;
converting the cancellation signal to a serial format; and
combining the cancellation signal with the incoming signal to reduce interference in the incoming signal.

2. The method of claim 1, wherein each signal is associated with a channel in the multi-channel communication device and each signal is subject to a single Fourier transform operation.

3. The method of claim 2, further comprising adding two or more weighted transform domain signals to generate a combined weighted transform signal that subsequently undergoes an inverse Fourier Transform to create a cancellation signal.

4. The method of claim 3, wherein distributing the transform domain signal to two or more multipliers comprises distributing the transform domain signal to one multiplier associated with each channel.

5. In a multi-channel environment, a method for canceling interference in two or more received signals arriving over two or more channels at a first communication device from a second communication device comprising:
receiving two or more outgoing signals, wherein the two or more outgoing signals are to be transmitted from the second communication device to the first communication device over two or more channels which connect the first communication device and the second communication device;
converting the two or more outgoing signals to a transform domain to create one transform domain signal for each channel;
distributing the transform domain signal for each channel to a multiplier associated with each channel;
processing, with the multiplier, the one transform domain signal from each channel with weighting variables to generate two or more cancellation signals in the transform domain;
combining the two or more cancellation signals in the transform domain to create a combined transform domain cancellation signal;
converting the combined transform domain cancellation signal out of the transform domain using one inverse transform unit associated with each channel to obtain a cancellation signal for each channel; and
combining the cancellation signal for each channel with the signal received on each channel to cancel interference.

6. The method of claim 5, wherein the processing comprises multiplying the transform domain signal with the weighting variable.

7. The method of claim 6, wherein the multiplying comprises an element by element multiply operation.

8. The method of claim 5, wherein receiving one or more outgoing signals comprise receiving four outgoing signals and combining the cancellation signal with a received signal comprises combining a cancellation signal with each received signal.

9. The method of claim 8, further comprising combining two or more of the two or more cancellation signals in the transform domain prior to converting the two or more cancellation signals in the transform domain out of the transform domain.

10. The method of claim 5, wherein converting comprises performing a Fast Fourier Transform on the outgoing signal.

11. The method of claim 5, further comprising performing overlap processing on the one or more outgoing signals and the one or more cancellation signals.

12. A cancellation system for reducing interference in a received signal in a communication system using four channels to communicate between two communication devices, wherein the cancellation system for each channel comprises:
inputs for receiving four outgoing signals at a first transceiver, the outgoing signal in a first domain are to be transmitted to a single communication device;.
four transform units configured to manipulate the four outgoing signals into four second domain signals and distribute the four second domain signals to at least one multiplier associated with each channel;
one or more multipliers associated with each channel configured to receive the distributed second domain signal from each channel and multiply the second domain signal with one or more weighting variables to create four cancellation signals in the second domain;
four inverse transform units configured to perform an inverse transform on the four cancellation signals in the second domain to create a cancellation signal in the first domain; and
four subtractors configured to subtract a cancellation signal that is in the first domain from one of the four a received signals.

13. The system of claim 12, wherein the four or more multipliers comprise a processor.

14. The system of claim 12, further comprising four or more summing junctions configured to add the cancellation signals in the second domain from the multipliers to generate a combined cancellation signal in the second domain and output the combined cancellation signal in the second domain to the inverse transform unit.

15. The system of claim 12, further comprising overlap processing modules configured to perform overlap processing on the four outgoing signal.

16. The system of claim 12, wherein the communication device comprises a four channel communication device and each cancellation system generates a cancellation signal that accounts for the interference from each of the four channels.

17. The system of claim 12, further comprising an adaptation system configured to adaptively generate weighting variables.

18. The system of claim 17, wherein the adaptation system comprises a transform unit configured to convert an error signal to the second domain and an adaptation module configured to process the error signal in the second domain to generate the weighting variables.

19. A cancellation system for use in a first transceiver at a first location and a second transceiver at a second location which communicate there between over two or more channels to cancel unwanted coupling comprising:
two or more inputs, wherein each input provides an outgoing signal to the cancellation system wherein the outgoing signals are outgoing to the first transceiver;
one transform unit associated with each channel, wherein each transform unit is configured to convert an outgoing signal from a channel to a transform domain to create one transform domain signal per channel;
one or more multipliers, wherein each multiplier is configured to receive one transform domain signal from each channel and multiply the outgoing signal from each channel in the transform domain with a weighting variable to create one or more cancellation signals in the transform domain;
one or more devices configured to combine two or more cancellation signals in the transform domain to create a combined cancellation signal in the transform domain for each channel; and
a inverse transform unit associated with each channel configured to receive the combined cancellation signal and reverse the processing of the transform units, to create two or more cancellation signals;

two or more combining junctions configured to combine the two or more cancellation signal with two more incoming signals, wherein the incoming signals arrive from the second transceiver.

20. The system of claim 19, wherein the transform units and the inverse transform units perform overlap processing and transform processing.

21. The system of claim 19, wherein one transform unit and one inverse transform unit is associated with each channel.

22. The system of claim 19, wherein the weighting variables are generated based on least mean square adaptation.

23. The system of claim 19, wherein the transform units perform any type of Fourier transform and the inverse transform units perform any form of inverse Fourier transform.

24. The system of claim 19, wherein the one or more devices configured to combine comprise one or more adders.

25. The system of claim 19, wherein the weighting variables are generated by an adaptation system and the adaptation system is shared between two or more channels.

26. A method for generating a cancellation signal in a cancellation system, wherein said method occurs within a multi-channel communication system comprising:

receiving at a cancellation system two or more signals, wherein the two or more signals relate to one or more outgoing signals on the two or more channels in the multi-channel communication system, and wherein the two or more outgoing signals on the two or more channels are transmitted from a first communication device to a second communication device connected by the two or more channels;

performing a single transform operation on each of the two or more signals to convert each of the two or more signals into a transform domain;

distributing the two or more signals in the transform domain to a multipliers associated with each of the channels;

multiplying the two or more signals in the transform domain by one or more weighting variables to create one or more multiplier outputs;

combining the one or more multiplier outputs associated with each channel to create a combined transform domain cancellation signal, wherein the transform domain cancellation signal is associated with a channel; and performing a single inverse transform operation on each of the transform domain cancellation signals to remove the cancellation signal from the transform domain and thereby create the cancellation signal for each channel.

27. The method of claim 26, wherein the cancellation signal is configured to cancel echo and crosstalk in the signal.

28. The method of claim 26, wherein a channel comprises a two conductor signal path.

29. The method of claim 26, wherein the transform domain comprises the frequency domain.

30. The method of claim 26, further comprising generating the one or more weighting variables based on a feedback error signal resulting from a combination of the cancellation signal and a received signal.

31. The method of claim 26, wherein the cancellation signal comprises components relating to each of the signals transmitted on other channels of the multi-channel communication device.

* * * * *